(12) United States Patent
Hwang et al.

(10) Patent No.: US 11,230,802 B2
(45) Date of Patent: Jan. 25, 2022

(54) ARTIFICIAL INTELLIGENCE-BASED CLOTHING MANAGING APPARATUS

(71) Applicant: LG Electronics Inc., Seoul (KR)

(72) Inventors: Sungmok Hwang, Seoul (KR); Jinok Kim, Seoul (KR); Yunsik Park, Seoul (KR); Dayun Han, Seoul (KR)

(73) Assignee: LG Electronics Inc., Seoul (KR)

( * ) Notice: Subject to any disclaimer, the term of this patent is extended or adjusted under 35 U.S.C. 154(b) by 174 days.

(21) Appl. No.: 16/557,689

(22) Filed: Aug. 30, 2019

(65) Prior Publication Data

US 2019/0385017 A1 Dec. 19, 2019

(30) Foreign Application Priority Data

Sep. 5, 2018 (KR) .................. 10-2018-0106196
Oct. 19, 2018 (KR) .................. 10-2018-0125286
Oct. 19, 2018 (KR) .................. 10-2018-0125287

(51) Int. Cl.
*G06T 7/00* (2017.01)
*G06K 9/62* (2006.01)
(Continued)

(52) U.S. Cl.
CPC ........... *D06F 33/36* (2020.02); *G06K 9/6254* (2013.01); *G06K 9/6256* (2013.01); *G06N 3/08* (2013.01);
(Continued)

(58) Field of Classification Search
CPC .. D06F 33/36; D06F 2103/02; D06F 2103/04; D06F 2103/34; D06F 2103/40;
(Continued)

(56) References Cited

U.S. PATENT DOCUMENTS

2017/0121891 A1* 5/2017 Cheon .................. G05B 19/10

FOREIGN PATENT DOCUMENTS

CN 105046280 A * 11/2015
CN 206034123 U * 3/2017
(Continued)

OTHER PUBLICATIONS

Extended European Search Report in EP Patent Application No. 19193241.7, dated Oct. 29, 2019, 8 pages.
(Continued)

*Primary Examiner* — Siamak Harandi
(74) *Attorney, Agent, or Firm* — Fish & Richardson P.C.

(57) ABSTRACT

The present invention relates to an artificial intelligence-based clothing management apparatus for receiving clothes in a hung state and treating the clothes, and a control method thereof. The apparatus may include an clothing containing portion disposed in a cabinet for receiving clothing to be treated in a hung manner; a camera to generate image information of the clothing contained in the clothing containing portion; a user interface configured to receive treatment information of the clothing from a user; and a processor configured to: obtain a learning result from a learning operation using image information previously acquired using the camera and treatment information previously acquired from the user interface; and process image information currently acquired using the camera with respect to the learning result, thereby to generate and set current treatment information; and control the apparatus to treat the clothing based on the set current treatment information.

18 Claims, 20 Drawing Sheets

(51) Int. Cl.
  D06F 33/36 (2020.01)
  G06N 3/08 (2006.01)
  *D06F 34/18* (2020.01)
  *D06F 34/28* (2020.01)
  *D06F 103/02* (2020.01)
  *D06F 103/04* (2020.01)
  *D06F 103/34* (2020.01)
  *D06F 103/40* (2020.01)
  *D06F 105/54* (2020.01)
  *D06F 105/58* (2020.01)
  *D06F 34/04* (2020.01)
  *D06F 101/00* (2020.01)
  *D06F 101/20* (2020.01)

(52) U.S. Cl.
  CPC ............ *G06T 7/0002* (2013.01); *D06F 34/04* (2020.02); *D06F 34/18* (2020.02); *D06F 34/28* (2020.02); *D06F 2101/00* (2020.02); *D06F 2101/20* (2020.02); *D06F 2103/02* (2020.02); *D06F 2103/04* (2020.02); *D06F 2103/34* (2020.02); *D06F 2103/40* (2020.02); *D06F 2105/54* (2020.02); *D06F 2105/58* (2020.02); *G06T 2207/30124* (2013.01)

(58) Field of Classification Search
  CPC .. D06F 2105/54; D06F 2105/58; D06F 34/04; D06F 2101/00; D06F 2101/20; D06F 34/18; D06F 34/28; G06K 9/6254; G06K 9/6256; G06N 3/08; G06T 7/0002; G06T 2207/30124
  See application file for complete search history.

(56) References Cited

FOREIGN PATENT DOCUMENTS

| | | | |
|---|---|---|---|
| CN | 107038622 A | * | 8/2017 |
| CN | 107574625 | | 1/2018 |
| EP | 2573247 | | 3/2013 |
| KR | 1020060112486 | | 11/2006 |
| KR | 1020090059358 | | 6/2009 |
| KR | 1020090100803 | | 9/2009 |
| KR | 1020120074557 | | 7/2012 |
| KR | 1020140073197 | | 6/2014 |
| KR | 2014217496 | | 11/2014 |
| KR | 1020170137503 | | 12/2017 |
| KR | 1020170137505 | | 12/2017 |
| KR | 1020170138559 | | 12/2017 |
| KR | 1020180051817 | | 5/2018 |
| WO | WO-2016020872 A1 | * | 2/2016 ............. D06F 33/00 |
| WO | WO-2017144085 A1 | * | 8/2017 ............. D06F 34/18 |

OTHER PUBLICATIONS

Notice of Allowance in Korea Patent Application No. 10-2018-0106196, dated Oct. 8, 2019, 5 pages (with English translation).

* cited by examiner

Query

FIG. 18

| Level | Fine dust amount | Final steam duration | Steam intensity | Moving Hanger |
|---|---|---|---|---|
| 1 | low (0-30) | Final steam duration = Default Steam Duration× Fine dust factor<br>Fine dust factor = Voltage Value Y X amount of fine dust | Weak | 80rpm |
| 2 | medium (31-80) | Final steam duration = Default Steam Duration× Fine dust factor | Weak | 100rpm |
| 3 | High (81-150) | Final steam duration = Default Steam Duration× Fine dust factor | Middle | 125rpm |
| 4 | Very high (151-) | Final steam duration = Default Steam Duration× Fine dust factor | Strong | 130rpm |

ARTIFICIAL INTELLIGENCE-BASED CLOTHING MANAGING APPARATUS

CROSS-REFERENCE TO RELATED APPLICATION

This application claims a benefit under 35 U.S.C. § 119(a) of Korean Patent Application Nos. 10-2018-0106196, 10-2018-0125286 and 10-2018-0125287 filed on Sep. 5, 2018, Oct. 19, 2018 and Oct. 19, 2018, respectively, on the Korean Intellectual Property Office, the entire disclosure of which are incorporated herein by reference for all purposes.

BACKGROUND

1. Field

The present disclosure relates to a home appliance for treating clothing received therein using artificial intelligence. More specifically, the present disclosure relates to an artificial intelligence-based clothing management apparatus for receiving clothes in a hung state and treating the clothes, and a control method thereof.

2. Description of Related Art

There are many kinds of home appliances that receive clothing and treat the clothing. That is, a variety of home appliances may be provided depending on types of the clothing and how to treat the clothing.

A home appliance that receives clothing and treats clothing may include a clothing washing apparatus, a clothing drying machine, a styler (a clothing treatment apparatus or clothing managing apparatus). In this connection, the clothing may include various kinds of clothing such as shirts, coats, trousers, dresses and so on.

Clothing treatment may include various treatments such as washing, drying, refreshing, sterilization. One clothing treatment apparatus may be provided for a specific treatment process of various treatment procedures or may be provided to perform a plurality of treatment procedures.

In the clothing washing apparatus, a washing course may be performed in which washing and rinsing are performed using washing water and then spinning is performed.

In the clothing drying machine, a drying or refreshing course may be provided in which drying or refreshing is performed using hot air.

These clothing treatment apparatuses provide various treatment courses depending on types of clothing. Auxiliary information related to parameters for controlling a treatment course may be included in each treatment course.

The home appliance may be extended to dishware washers that treat dishware or to cooking appliances that cook food ingredients. In such dishware washer or cooking appliances, the object received therein may be treated via various treatment courses depending on a user's intention or according to a type of the object.

In a conventional home appliance, when a user puts clothing into a clothing reception area, and then inputs clothing treatment information, the appliance treats the clothing according to the input treatment information.

In the clothing washing machine, the clothing to be washed is put into a clothing accommodating portion such as a drum. After a user selects a specific washing course from a variety of washing courses, washing is usually performed according to the washing course selected.

For example, when a user intends to wash bedding such as a blanket, the user may choose "blanket course". When a user intends to wash laundry made of wool, the user may choose "wool course".

It is common for a home appliance to provide a plurality of treatment information for objects to be treated. For example, depending on types of home appliances, treatment information is provided in specific course forms such as washing course, drying course, refreshing course, cleaning course, cooking course. It is common that each of the washing course, drying course, refreshing course, cleaning course, and cooking course may have a plurality of optional or auxiliary treatment information. The clothing washing machine may provide multiple treatment information including multiple courses, such as a standard course, a baby clothes course, a blanket course, and a functional clothes course. The term "a plurality of information", "multiple information" or "a variety of information" mean plural pieces/sets/collections of different information, such as first information, second information and so on.

Treatment information or course information can be tailored as an optimal treatment method according to the type of the object to be treated. In other words, to prevent damage of the object to be treated along with achieving optimal treatment results, a series of object treatment procedures and treatment conditions may be pre-established based on the type of the object.

For the clothing washing machine, although a variety of treatment information are provided depending on the type of laundry being treated, the user generally uses the treatment information selected by default only. Therefore, there is a problem that the clothing washing machine cannot be used efficiently by the user.

Further, whenever a user wishes to wash the laundry using a laundry washing machine, the treatment information must be manually selected and input by the user. This may require much effort.

Recently, a clothing treatment apparatus as a home appliance which treats clothing while the clothing being hung inside a cabinet has been widely used. The clothing treating apparatus may be a home appliance that refreshes or sterilizes the clothing by supplying hot air, cold air or steam to the clothing in place of washing using washing-water. When the user intends to remove fine dust from clothes or dry rain-wet clothes, the clothing treatment apparatus may be used. For this reason, this clothing treatment apparatus as the home appliance is referred to as various terms such as refresher, styler, and clothing cleaner.

In recent years, many users have been exposed to fine dust due to serious air pollution. Fine dust is generally defined as dust having its average diameter less than 10 μm. In some countries, like South Korea, dust is classified as fine dust if its average diameter is less than 2.5 μm. In the home, air cleaners are widely used to remove fine dust. Fine dust on clothing may play a role in increasing a fine dust density in the house as well. For this reason, there are increasing needs in the home appliance for wearing fresh clothing and effectively removing the fine dust on clothing.

This clothing treatment apparatus is configured to treat a small amount of clothing. In one example, the apparatus is configured to treat one or three pieces of clothing. The clothing is positioned inside the clothing containing portion while being hung on a hanger. In another example, clothing such as a towel may be positioned inside the clothing containing portion while being well folded and stacked.

The clothing managed using the clothing treatment apparatus may not be subjected to washing using water, and may be relatively expensive clothing vulnerable to damages caused by normal washing with water. Therefore, an optimal management course should be set according to a kind of the clothing.

In some clothing treatment apparatuses, strong air is sprayed on the clothing to remove dust from the clothing. Alternatively, the apparatus may remove fine dust by filtering fine dust using circulating air. In some clothing treatment apparatuses, when steam is supplied, steam particles wrap around the fine dust particles to remove the fine dust from the clothes. Since the fine dust is a current hot issue in health, the clothing treatment apparatus provides a specialized separate course or process for the fine dust removal.

However, this fine dust removal process requires the user to be aware of the need to remove the fine dust and actively select a course or process for the dust removal using an user interface. Therefore, the fine dust removal process provided by the conventional clothing treatment apparatus may not be effectively used.

Further, when the fine dust is not visible, it is difficult for the user to determine whether there is fine dust on the clothing. Even when the fine dust removal process is performed, it is difficult for the user to grasp how much the fine dust has been removed.

In one example, the clothing that the user wears when the user goes out in wet or rainy weather has much water soaked thereinto. That is, the clothing that have already been exposed to fine dust may be exposed to moisture next. In this case, the fine dust is not easily separated from the clothing. It is known that when the user dusts off dry clothes, much dust can be separated out. Therefore, when the clothing treatment is applied to the wet clothes, the drying or refreshing may need to be performed first. However, effective fine dust removal may not be performed When a user strongly dusts off the clothing manually after the drying, a lot of the dust or fine dust may come out. Thus, the user's satisfaction with the cloth treatment apparatus is inevitably lowered. Further, it is not easy for the user to manipulate the clothing treatment apparatus so that the wet clothing is dried first and then the fine dust removal is performed afterwards. This is because such manipulation is troublesome and requires multiple complicated manipulation steps. This is also because a drying course and a course for removing dust (e.g. refreshing course) cannot usually be selected at the same time.

Recently, artificial intelligence has become a hot topic in the home appliances. However, currently, in the home appliances, the artificial intelligence is only about providing users with specific information based on accumulated data on the home appliances. Strictly speaking, this operation may not be a true artificial intelligence based operation but merely a data processing.

Therefore, it is necessary to provide a home appliance having artificial intelligence which evolves via learning rather than using a simple cumulative data processing. Thus, the home appliance may be provided which automatically sets optimal treatment information without the user having to input the treatment information.

Especially, since the type and amount of clothing to be treated by using the home appliance among all the clothes of the user are limited, it will be necessary to provide a convenient home appliance that learns and reflects user's individual characteristics in terms of the clothing.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

One embodiment of the present disclosure is to provide a clothing management apparatus and a control method thereof in which learning is performed to set optimal treatment information without the user having to input the treatment information.

One embodiment of the present disclosure is to provide a clothing management apparatus and a control method thereof in which since an imaging angle of the clothing accommodated in the clothing containing portion is within a predetermined level unlike the clothing managing apparatus, the type and state of the clothing may be identified such that treatment information corresponding thereto may be set.

One embodiment of the present disclosure is to provide a clothing management apparatus and a control method thereof in which even when there is no specific manipulation of the user, the wet state of clothing is automatically recognized such that the clothes is treated after drying the clothing or dehumidifying the clothing.

One embodiment of the present disclosure is to provide a clothing management apparatus and a control method thereof in which specific clothing is detected using image information and the wetting of the specific clothing is detected using weight information of the clothing, thus to provide the user with optimal clothing treatment information.

One embodiment of the present disclosure is to provide a clothing management apparatus and a control method thereof in which there is no need to for the user to select a drying course of the wet clothing and, then, after the drying course termination, to select a course for the clothing separately. In other words, one embodiment of the present disclosure is to provide a clothing management apparatus and a control method thereof in which when drying of the clothing is required, the clothing managing apparatus may automatically recognize by itself that drying of the clothing is required may automatically dry the clothing and may carry out subsequent clothing treatment. Thus, one embodiment of the present disclosure is to provide a clothing management apparatus and a control method thereof in which the user chooses a course just one time or does not have to choose a course due to the presence of recommendation of the course, to improve the user convenience.

One embodiment of the present disclosure is to provide a clothing management apparatus and a control method thereof in which a fine dust removal process may be automatically executed in response to a level of fine dusts.

One embodiment of the present disclosure is to provide a clothing management apparatus and a control method thereof in which fine dust removal may be effectively executed by changing the main treatment information set by learning or user selection with considering the fine dust level.

One embodiment of the present disclosure is to provide a clothing management apparatus and a control method thereof in which the fine dust removal may be effectively and conveniently executed by automatically adding or applying a fine dust removal logic to the main treatment information set by learning or user selection.

One embodiment of the present disclosure is to provide a clothing management apparatus and a control method thereof in which the user determines whether to apply the fine dust removal logic automatically, thereby to improve the user convenience. One embodiment of the present disclosure is to provide a clothing management apparatus and a control method thereof in which the user determines that the fine dust removal logic is automatically applied under weather or season having a high level of the fine dusts, thereby to improve the user convenience.

One embodiment of the present disclosure is to provide a clothing management apparatus and a control method thereof in which the level of satisfaction of the user may increase because the user may be informed of the concentration, quantity or level of fine dusts. Especially, one embodiment of the present disclosure is to provide a clothing management apparatus and a control method thereof in which the apparatus can increase the satisfaction of users by notifying the user of the fine dust level change between before and after the treatment of clothing.

One embodiment of the present disclosure is to provide a clothing management apparatus and a control method thereof, in which the effective fine dust removal may be executed by providing a plurality of fine dusts control logic having the stepwise varying removal intensities of fine dusts respectively based on the current levels of the fine dusts.

One embodiment of the present disclosure is to provide a clothing management apparatus and a control method thereof in which the fine dust-related information is sent to a server and then the apparatus may download an updated fine dust control logic from the sever.

One embodiment of the present disclosure is to provide a clothing management apparatus and a control method thereof in which the fine dust removal effect may be improved by supplying steam to the clothing while applying strong vibration to the clothing.

One embodiment of the present disclosure is to provide a clothing managing apparatus and a control method thereof that may set optimal treatment information via learning without requiring the user to enter treatment information manually.

One embodiment of the present disclosure is to provide a clothing management apparatus and a control method thereof in which, based on image information and weight information, specific clothing, specific clothing type, and wetting of specific clothing are detected such that the optimal treatment information may be automatically set.

One embodiment of the present disclosure is to provide a clothing managing apparatus and control method thereof, by which a mode in which the user manually entering treatment information and a mode in which the clothing managing apparatus automatically sets treatment information are selectively and easily performed.

One embodiment of the present disclosure is to provide a clothing managing apparatus and a control method thereof that may enhance user satisfaction by informing the user that the appliance performs learning and is evolving.

One embodiment of the present disclosure is to provide a clothing managing apparatus and a control method thereof in which the user permits the appliance to perform learning or injects information to the appliance or directly trains the apparatus for correct learning of the apparatus.

One embodiment of the present disclosure is to provide a clothing managing apparatus and a control method thereof in which the learning is performed only using information acquired from a specific clothing managing apparatus used by a user to enable the user-customized learning. Further, one embodiment of the present disclosure is to provide a clothing managing apparatus and a control method thereof in which the information needed for learning is minimized to reduce time taken for the learning, and to simplify the learning process.

One embodiment of the present disclosure is to provide a clothing managing apparatus and a control method thereof in which a correction process may be performed to change sub information or auxiliary information of the treatment information during or after the clothing treatment based on the set treatment information.

One embodiment of the present disclosure is to provide a clothing managing apparatus and a control method thereof in which treatment information about clothing that affects the clothing treatment but is not general but special is automatically set.

One embodiment of the present disclosure is to provide a clothing managing apparatus and a control method thereof in which the treatment information may be set via learning using the image information generated by automatically capturing the clothing accommodated in the clothing receiving portion.

One embodiment of the present disclosure is to provide a clothing managing apparatus and a control method thereof in which the learning is performed automatically and the user may selectively use the learning result.

One embodiment of the present disclosure is to provide a clothing managing apparatus and a control method thereof in which the clothing managing apparatus may learn user-specific usage pattern and thus provide the course setting customized to the user.

One embodiment of the present disclosure is to provide a clothing managing apparatus and a control method thereof in which the user may intuitively and easily determine whether the clothing managing apparatus performs learning and/or whether the learning is possible.

One embodiment of the present disclosure is to provide a clothing managing apparatus and a control method thereof in which the fine dust elimination logic may be applied based on the type of clothing or to the specific clothing, and then the application results may be obtained and then the fine dust elimination logic may be updated based on the application results. Especially, one embodiment of the present disclosure is to provide a clothing managing apparatus and a control method thereof in which the fine dust elimination logic may be updated easily and may be easily downloaded using the communication between the server and terminal.

In a first aspect of the present disclosure, there is provided an artificial intelligence-based clothing managing apparatus comprising: a cabinet; a clothing containing portion disposed in the cabinet for receiving therein a clothing to be treated in a hung manner; a door provided on the cabinet for opening and closing the clothing containing portion; a camera disposed on the cabinet or door to generate image information of the clothing contained in the clothing containing portion; a user interface disposed on a front face of the door and configured to receive treatment information of the clothing from a user; and a main processor configured to: obtain a learning result from a learning operation using image information previously acquired using the camera and treatment information previously acquired from the user interface; and process image information currently acquired using the camera with respect to the learning result, thereby to generate and set current treatment information; and control the apparatus to treat the clothing based on the set current treatment information.

In one implementation, the artificial intelligence-based clothing managing apparatus may learn using image information generated by the camera. Therefore, the artificial intelligence-based clothing managing apparatus may be called a vision-based artificial intelligence-based clothing managing apparatus.

In one implementation, the current treatment information may be set by the main processor. Alternatively, the main processor may receive the current treatment information that may be set using a server.

In one implementation, the set treatment information may be informed to the user using the user interface. The user interface may inform the user of treatment currently performed based on the set treatment information. The user interface may inform the user of remaining time information or currently executed treatment (refreshing, drying, or deodorization treatment).

In one implementation, the image information is an input parameter for the learning operation, and the treatment information is an output parameter from the learning operation.

In one implementation, the learning operation is performed using a learning processor embedded in the apparatus or a learning processor in a server communicating with the apparatus. However, it is desirable that the database of the learning results be provided in the apparatus itself. Thus, a specialized database customized to the user himself may be configured. Further, time consuming due to database creation, augmentation, and modification can be minimized.

In one implementation, the user interface includes at least one of a speaker for outputting voice, a microphone for receiving voice, a display, or a button or touch panel for receiving pressurization or physical contact from a user.

In one implementation, the learning operation includes determining presence or absence of a learning result corresponding to the currently acquired image information.

In one implementation, upon determination that the corresponding learning result is present, treatment information corresponding to the learning result is output and set.

In one implementation, after setting the treatment information, the set treatment information is approved or disapproved by the user using the user interface.

In one implementation, when the user disapproves the set treatment information, a forced learning operation is performed to match treatment information allowed by the user with the currently acquired image information. In other words, it is preferable that the treatment information set by the user is given priority over the treatment information set by the learning.

In one implementation, upon determination that the corresponding learning result is absent, a forced learning operation is performed to match treatment information allowed by the user with the currently acquired image information.

In one implementation, the forced learning step may be configured such that when new treatment information is recommended, the new treatment information may be approved by the user, or the user directly match the treatment information with the current image.

In one implementation, the learning operation is configured to increase a number of combinations of a plurality of mutually-distinguished image information and treatment information corresponding to the plurality of mutually-distinguished image information respectively. Thus, the user may notice based on the increase that the apparatus evolves. In other words, the user may perceive that the machine gets smarter.

In one implementation, the user interface includes a start input interface to allow the user to approve the set treatment information such that the appliance starts the clothing treatment based on the set treatment information. The start input interface may be implemented as a physical button or using user speech recognition via a microphone.

In one implementation, the treatment information includes a plurality of course information corresponding to treatment courses performed by the apparatus.

In one implementation, the plurality of course information may include the plurality of course items. Each course item may include a plurality of sub courses. A specific course information may not include a corresponding auxiliary or sub course.

In one implementation, the treatment information include auxiliary information in the course information.

In one implementation, the auxiliary information includes at least one of a washing-water temperature, washing-water level, spinning RMP, washing strength, washing time duration, rinsing frequency, or steam presence or absence.

In one implementation, the auxiliary information includes at least one of a drying or refreshing time duration, hot air temperature, temperature inside the clothing containing portion, dryness level, humidity, or steam presence or absence.

In one implementation, the learning operation includes a correction process that changes the auxiliary information during or after treatment of the clothing based on the set current treatment information.

In one implementation, during the treatment of the clothing based on the set current treatment information, image information of the clothing contained in the clothing containing portion is additionally generated.

Using this additional image generation, the learning may be performed and the course setting may be performed automatically. Therefore, this may be more effective because the treatment information may be corrected by using the image during the treatment, that is, before the termination of the treatment, rather than using fixed treatment information including only the initial image.

In one implementation, the current treatment information may be set automatically. That is, when the user does not currently enter the treatment information using the user interface, the current treatment information may be set automatically. In one embodiment, the automatic setting is preferably distinguished from the default setting. The default setting refers to the treatment information setting that is performed basically in the power application and to which the learning result is not reflected at all. On the other hand, the automatic setting refers to information setting that reflects the learning result. Therefore, it is preferable to use the user interface to recognize that the current setting is an automatic setting by learning, using a character notification, a voice notification, or fixed turn on of the LED after the LED is turned on variably.

In one implementation, the treatment information includes a plurality of course information corresponding to treatment courses performed by the apparatus.

In one implementation, when a learning result corresponding to at least one course information among the plurality of course information is present, the current treatment information is set automatically. If there is no learning result, a forced or injected learning step may be performed.

In one implementation, when a learning result corresponding to each of the plurality of course information is present, the current treatment information is set automatically. If there is no learning result, a forced or injected learning step may be performed.

In one implementation, the user interface includes a course selection interface to allow the user to select one of the plurality of course information, wherein the plurality of course information includes a learning-based course in which the current treatment information is automatically set based on the learning result.

In one implementation, the user interface includes a learning-based course selection interface to allow the user to select the learning-based course, wherein the learning-based course selection interface is different from the course selection interface.

In one implementation, when the user selected the learning-based course immediately before using the course selection interface or the learning-based course selection interface, the learning-based course is currently selected by default.

In one implementation, when a course other than the learning-based course among the plurality of course information is selected, the processor is configured to perform learning using the currently acquired image information for the selected course. In this case, the learning may be performed but the learning result is not reflected. Therefore, even when the learning result is not reflected, continuous evolving of the apparatus may be promoted.

In one implementation, the apparatus further include a door sensor to detect whether the door is closed, wherein the camera generates the image information after power is applied to the apparatus and a closed state of the door is detected by the door sensor. Further, the camera may generate additional image information before completing the treatment or during treatment of the clothing in the closed door state. Likewise, the learning may be performed using the additional images which may be used to correct previously set treatment information.

According to a second aspect of the present disclosure, a control method of a clothing managing apparatus may be provided, the method including a step to create and acquire image information using the camera; a step to acquire clothing treatment information set by user; a step to perform learning using previously acquired image information and clothing treatment information; and a step of treating the clothing based on the current treatment information set using the learned result and the currently acquired image information.

The control method may include a correction step as described above. The method may include additional image generation steps.

The features in the above-described embodiments may be in combination with features in other embodiments, unless they are exclusive or contradictory to each other.

The effects of the present disclosure include, but are not limited to followings.

One embodiment of the present disclosure may provide a clothing management apparatus and a control method thereof in which learning is performed to set optimal treatment information without the user having to input the treatment information.

One embodiment of the present disclosure may provide a clothing management apparatus and a control method thereof in which since an imaging angle of the clothing accommodated in the clothing containing portion is within a predetermined level unlike the clothing managing apparatus, the type and state of the clothing may be identified such that treatment information corresponding thereto may be set.

One embodiment of the present disclosure may provide a clothing management apparatus and a control method thereof in which even when there is no specific manipulation of the user, the wet state of clothing is automatically recognized such that the clothes is treated after drying the clothing or dehumidifying the clothing.

One embodiment of the present disclosure may provide a clothing management apparatus and a control method thereof in which specific clothing is detected using image information and the wetting of the specific clothing is detected using weight information of the clothing, thus to provide the user with optimal clothing treatment information.

One embodiment of the present disclosure may provide a clothing management apparatus and a control method thereof in which there is no need to for the user to select a drying course of the wet clothing and, then, after the drying course termination, to select a course for the clothing separately. In other words, one embodiment of the present disclosure may provide a clothing management apparatus and a control method thereof in which when drying of the clothing is required, the clothing managing apparatus may automatically recognize by itself that drying of the clothing is required may automatically dry the clothing and may carry out subsequent clothing treatment. Thus, one embodiment of the present disclosure may provide a clothing management apparatus and a control method thereof in which the user chooses a course just one time or does not have to choose a course due to the presence of recommendation of the course, to improve the user convenience.

One embodiment of the present disclosure may provide a clothing management apparatus and a control method thereof in which a fine dust removal process may be automatically executed in response to a level of fine dusts.

One embodiment of the present disclosure may provide a clothing management apparatus and a control method thereof in which fine dust removal may be effectively executed by changing the main treatment information set by learning or user selection with considering the fine dust level.

One embodiment of the present disclosure may provide a clothing management apparatus and a control method thereof in which the fine dust removal may be effectively and conveniently executed by automatically adding or applying a fine dust removal logic to the main treatment information set by learning or user selection.

One embodiment of the present disclosure may provide a clothing management apparatus and a control method thereof in which the user determines whether to apply the fine dust removal logic automatically, thereby to improve the user convenience. One embodiment of the present disclosure may provide a clothing management apparatus and a control method thereof in which the user determines that the fine dust removal logic is automatically applied under weather or season having a high level of the fine dusts, thereby to improve the user convenience.

One embodiment of the present disclosure may provide a clothing management apparatus and a control method thereof in which the level of satisfaction of the user may increase because the user may be informed of the concentration, quantity or level of fine dusts. Especially, one embodiment of the present disclosure may provide a clothing management apparatus and a control method thereof in which the apparatus can increase the satisfaction of users by notifying the user of the fine dust level change between before and after the treatment of clothing.

One embodiment of the present disclosure may provide a clothing management apparatus and a control method thereof, in which the effective fine dust removal may be executed by providing a plurality of fine dusts control logic having the stepwise varying removal intensities of fine dusts respectively based on the current levels of the fine dusts.

One embodiment of the present disclosure may provide a clothing management apparatus and a control method thereof in which the fine dust-related information is sent to a server and then the apparatus may download an updated fine dust control logic from the sever.

One embodiment of the present disclosure may provide a clothing management apparatus and a control method thereof in which the fine dust removal effect may be improved by supplying steam to the clothing while applying strong vibration to the clothing.

One embodiment of the present disclosure may provide a clothing managing apparatus and a control method thereof that may set optimal treatment information via learning without requiring the user to enter treatment information manually.

One embodiment of the present disclosure may provide a clothing management apparatus and a control method thereof in which, based on image information and weight information, specific clothing, specific clothing type, and wetting of specific clothing are detected such that the optimal treatment information may be automatically set.

One embodiment of the present disclosure may provide a clothing managing apparatus and control method thereof, by which a mode in which the user manually entering treatment information and a mode in which the clothing managing apparatus automatically sets treatment information are selectively and easily performed.

One embodiment of the present disclosure may provide a clothing managing apparatus and a control method thereof that may enhance user satisfaction by informing the user that the appliance performs learning and is evolving.

One embodiment of the present disclosure may provide a clothing managing apparatus and a control method thereof in which the user permits the appliance to perform learning or injects information to the appliance or directly trains the apparatus for correct learning of the apparatus.

One embodiment of the present disclosure may provide a clothing managing apparatus and a control method thereof in which the learning is performed only using information acquired from a specific clothing managing apparatus used by a user to enable the user-customized learning. Further, one embodiment of the present disclosure may provide a clothing managing apparatus and a control method thereof in which the information needed for learning is minimized to reduce time taken for the learning, and to simplify the learning process.

One embodiment of the present disclosure may provide a clothing managing apparatus and a control method thereof in which a correction process may be performed to change sub information or auxiliary information of the treatment information during or after the clothing treatment based on the set treatment information.

One embodiment of the present disclosure may provide a clothing managing apparatus and a control method thereof in which treatment information about clothing that affects the clothing treatment but is not general but special is automatically set.

One embodiment of the present disclosure may provide a clothing managing apparatus and a control method thereof in which the treatment information may be set via learning using the image information generated by automatically capturing the clothing accommodated in the clothing receiving portion.

One embodiment of the present disclosure may provide a clothing managing apparatus and a control method thereof in which the learning is performed automatically and the user may selectively use the learning result.

One embodiment of the present disclosure may provide a clothing managing apparatus and a control method thereof in which the clothing managing apparatus may learn user-specific usage pattern and thus provide the course setting customized to the user.

One embodiment of the present disclosure may provide a clothing managing apparatus and a control method thereof in which the user may intuitively and easily determine whether the clothing managing apparatus performs learning and/or whether the learning is possible.

One embodiment of the present disclosure may provide a clothing managing apparatus and a control method thereof in which the fine dust elimination logic may be applied based on the type of clothing or to the specific clothing, and then the application results may be obtained and then the fine dust elimination logic may be updated based on the application results. Especially, one embodiment of the present disclosure may provide a clothing managing apparatus and a control method thereof in which the fine dust elimination logic may be updated easily and may be easily downloaded using the communication between the server and terminal.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure:

FIG. 2 is a schematic view of a mounting structure of a weight sensor shown in

FIG. 1;

FIG. 18 shows a fine-dust removal logic that may be applied to one embodiment of the present disclosure;

DETAILED DESCRIPTIONS

Figure 1:
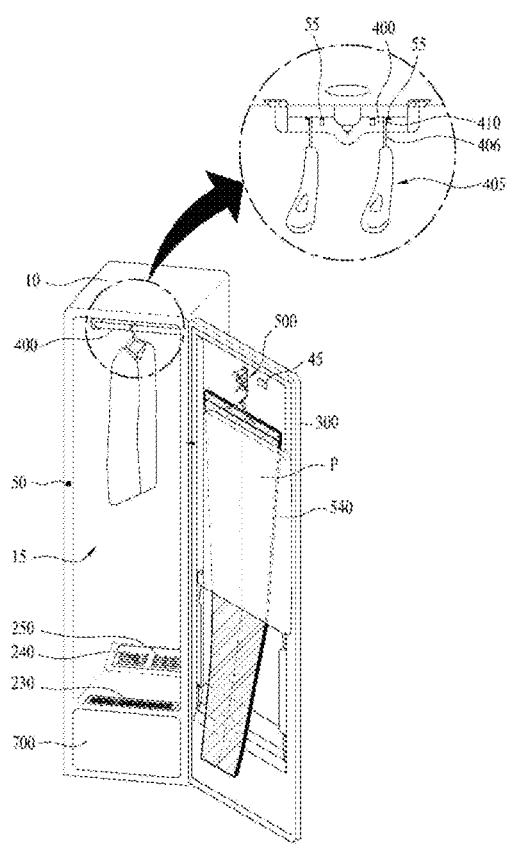
FIG. 1 is a perspective view of one example of a clothing managing apparatus according to one embodiment of the present disclosure.

For simplicity and clarity of illustration, elements in the figures are not necessarily drawn to scale. The same reference numbers in different figures denote the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a AI-based clothing managing apparatus and a control method thereof according to one embodiment of the present disclosure will be described in detail with reference to the accompanying drawings.

The present applicant has field Korean Patent Application No. 10-2018-0106196 (hereinafter referred to as "co-pending preceding patent application") which discloses an AI-based clothing managing apparatus using vision-based artificial intelligence.

The co-pending preceding patent application discloses a clothing managing apparatus in which image information and treatment information of clothing put into a clothing containing portion may be learned to set optimal clothing treatment information about one or more specific pieces of clothing which in turn may be treated based on the optimal clothing treatment information.

Further, the co-pending preceding patent application discloses a clothing managing apparatus which can automatically recommend and set clothing treatment information based on a learning result from learning based on the clothing treatment information that the user has selected previously. The apparatus may recognize the one or more specific pieces of clothing via learning of the image information thereof, and output the optimal treatment course for the clothing and recommend an optimal treatment course. In one example, the apparatus may recommend and set a high quality coats course provided by the clothing managing apparatus for a specific coat.

However, treatment information recommended and set by the co-pending preceding patent application may not be applied to special situations. In other words, optimal treatment information may be presented in general and repetitive situations. Optimal treatment information may not automatically be set in special circumstances such as rainy weather, very high humidity or much fine dust, or in special situations where clothing is wet with rain or snow.

In one example, a high-quality clothing coat course for a specific coat may be automatically set and performed under weather conditions involving very high concentration fine dust levels. In this case, however, the course may be terminated without sufficient removal of moisture or sufficient fine dust removal. This is because the general and repeatedly used clothing treatment information is associated with a formalized clothing treatment process, and is basically associated with a process for treating dry clothing, and is not associated with a clothing treatment process to optimally remove the fine dust.

Therefore, it will be necessary to provide a clothing managing apparatus which can automatically recommend and set optimal clothing treatment information in the general situation as well as the special situations.

In particular, a clothing managing apparatus, which automatically determines whether clothing is wet, and, if so, automatically dries the clothing and then treats the clothing fur dust removal, is needed. It may be necessary to provide a clothing managing apparatus which may enhance the treatment effect of the clothing in subsequent clothing treatments and may more effectively remove fine dust due to the preceding automatic drying process.

Further, the clothing managing apparatus should perform fine dust removal processes automatically based on fine dust concentrations or levels.

The present disclosure claims priority of the above proposals of the co-pending prior patent application as described above. The present disclosure suggests proposals of and improvements to the co-pending prior patent application.

FIG. 1 is a perspective view of one example of a clothing managing apparatus according to one embodiment of the present invention. The clothing managing apparatus in FIG. 1 may include a casing 1. Referring to FIG. 1, the clothing managing apparatus may include a cabinet 10 forming the appearance, an inner casing 15 providing a receptacle for accommodating clothing therein, and a door 300 for opening and closing the cabinet. The inner casing 15 may act as a clothing containing portion disposed in the cabinet and containing the treatment target clothing in a hanging manner.

The clothing managing apparatus may include a hanger 400 or 500 mounted at the door or at the inner casing on which the clothing is hung, and a support 540 provided under the hanger to support the clothing surface.

As a result, the clothing managing apparatus could supply hot air/cold air to an air supply positioned under the cabinet or press the clothing to deodorize and flatten the clothing while the clothing is received in the cabinet in a hung manner.

Below the inner casing 15, a mechanical chamber may be defined. A mechanical chamber door 700 may open and close the mechanical chamber. The mechanical chamber may contain various kinds of hardware. The mechanical chamber has an outlet 230 for supplying steam or moisture mist, an hot air or cold air outlet 240, and an hot air or cold air inlet 250. Therefore, a steam generator, a water bottle, a drain pipe, a heater (heat pump), and a fan may be provided in the mechanical chamber. In addition, a filter may be provided near the inlet 250. The filter may be configured to filter dust or fine dust and may be detachably installed in the mechanical chamber. A plurality of filters may be provided depending on the filter performance.

Hot air or cold air may be supplied to the inside of the clothing containing chamber and then may be collected back. Thus, this may remove moisture in the clothing containing chamber, or remove dust or fine dust from the clothing. The heat pump may be used to remove moisture from the air.

Further, on a front face of the door 300, a control panel 100 may be provided for inputting the operation of the clothing managing apparatus or for indicating the operation state of the clothing managing apparatus. That is, a user interface may be provided. The control panel 100 or the user interface may be configured as a separate component from the door 300, or may be provided as a part of the door.

The user may enter or select clothing treatment information using the user interface. The user may be aware of the currently executed clothing treatment information using the user interface. Therefore, the user interface may act as both of input means for inputting information and output means for outputting information.

As shown in FIG. 1, the clothing managing apparatus according to one embodiment of the present invention may include a weight sensor 55 which may sense the weight of the clothing. The weight sensor 55 may be dispose on a clothing hanger 406 or a support rod 400.

Specifically, the support rod 400 may has a slot 410 defined therein in which a hook 406 of a removable hanger 405 is received. The slot 410 may be formed in a downwardly recessed shape. The removable hanger may be used exclusively for the clothing managing apparatus.

Therefore, the weight sensor may sense the weight of clothing via the removable hanger. In other words, the weight sensor may only sense the weight of the clothing except the weight of the removable hanger.

The support rod 400 may be configured to vibrate to apply vibration to the clothing. In one example, the support rod may vibrate at a frequency of up to 200 times per minute. Therefore, it is necessary to protect the weight sensor 55 from such vibration.

Figure 2:
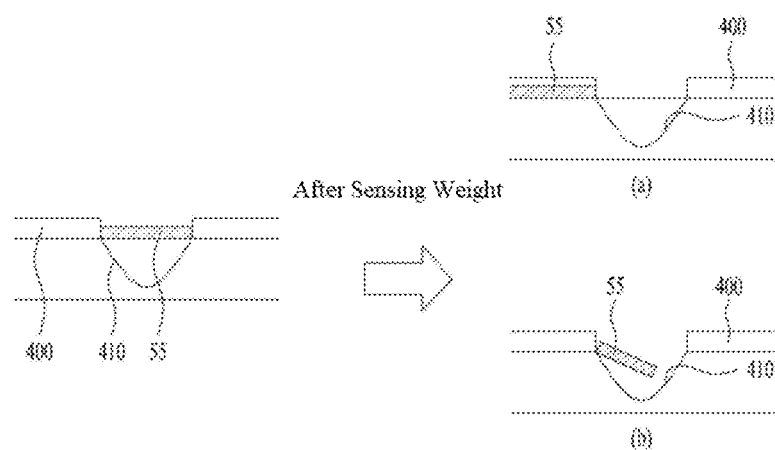

As shown in FIG. 2, the weight sensor 55 may be movably mounted on the support rod 400. The weight is sensed while the weight sensor 55 is positioned in the slot 410. Then, the sensor may be removed from the slot 410. Then, the hook 406 may be inserted into the slot 410 to allow the removable hanger to vibrate together with the clothing. The sensor 55 may be prevented from the contact or friction with the hook 406.

In one example, the weight sensor may be configured to move horizontally relative to the support rod, or may be configured to swing relative to the support rod. The weight sensor may be embodied as various forms or may employ a piezoelectric device.

A moving mechanism of the weight sensor is not a major feature of the embodiment of the present disclosure. This is because various types of moving mechanisms may be employed. Therefore, detailed descriptions of the specific form of the weight sensor and moving mechanism will be omitted. However, it is desirable to move the weight sensor at the weight sensing time and the weight non-sensing time.

When the user puts the clothing in the cabinet and closes the door 300, the clothing managing apparatus may automatically measure the weight of the clothing using the weight sensor 55. Because fine dust are embedded in clothing or infiltrated into clothing, fine dust should be separated from the clothing first to effectively remove the fine dust. That is, the clothing must be dried. Therefore, weight information may be used to automatically recognize whether the clothing is wet.

When, using the weight sensor, the clothing is determined to be wet, the apparatus may first automatically perform an operation to dry or dehumidify the clothing. Afterwards, the clothing treatment including a process for removing fine dust may be performed.

Figure 3:
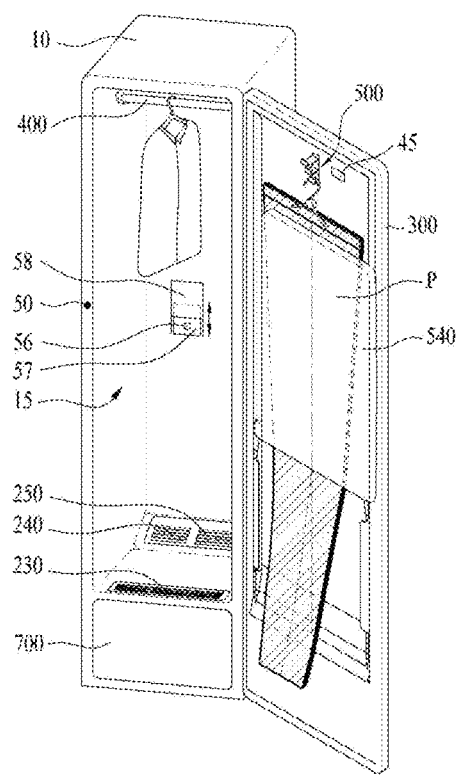
FIG. 3 is a perspective view of one example of a clothing managing apparatus according to another embodiment of the present disclosure.

FIG. 3 shows a clothing managing apparatus according to another embodiment of the present invention.

As shown in FIG. 3, the clothing managing apparatus according to one embodiment of the present invention may include a fine dust sensor 56. The fine dust sensor 56 may be provided together with the weight sensor shown in FIG. 1.

The fine dust sensor may be employed in an air purifier. However, the fine dust sensor may be only used for cleaning or purifying indoor air. Conventionally, people were not aware of the problem that fine dust may contaminate clothing up to a non-negligible degree, and a need of effectively removing the fine dust from the contaminated clothing. Conventionally, only solutions of removing dust from clothing have been proposed. There was, however, a lack of awareness of how much fine dust contamination could occur and how much fine dusts could be removed.

According to the present embodiment, there is provided a clothing managing apparatus capable of effectively removing fine dust by sensing the fine dust concentration, level, or amount using the fine dust sensor 56. In particular, according to the present embodiment, the user may be aware of the level or amount of fine dust, and more preferably the user may perceive a reduced fine dust level or amount using the clothing treatment.

When a user puts the clothing into the cabinet and closes the door 300, the clothing managing apparatus may automatically measure the fine dust level using the fine dust sensor 56. When the fine dust sensor is applied, the drying or dehumidifying step may be performed first. Because the fine dust are embedded in the clothing or infiltrated into the clothing, the fine dust should be separated from the clothing to measure a fine dust level. However, it is not easy to separate the fine dust from wet clothing. Therefore, it is desirable to dry the clothing and then dust off the fine dust and then to measure the fine dust level. It is desirable to perform a fine dust removal cycle based on the amount or level of fine dust as measured. The higher the level of fine dust, the greater the intensity or duration of the fine dust removal cycle.

The fine dust sensor may sense the fine dust level using a variety of principles. In one example, the sensor may sense fine dust by using a light emitting part and a light receiving part. In one example, the higher the fine dust concentration, the lower an output voltage the dust sensor can output. In one example, the voltage may be 0 voltage when the fine dust concentration is extremely high. As the fine dust concentration is lower, the fine dust sensor can output higher voltage values which may be around 5 voltage in one example. Therefore, the fine dust level may be grasped in proportion to the output voltage value. T The fine dust sensor may be used to output or determine the fine dusts level in multiple steps. More specifically, the fine dust level may be output or determined. Notifying the user of the fine dust level or the fine dust amount as detected using the fine dust sensor may allow the user to intuitively grasp the current level of fine dust.

The sensing mechanism of the fine dust sensor may cause the sensor to be vulnerable to moisture. Therefore, it is necessary to protect the fine dust sensor from the drying operation where hot air is supplied into the clothing containing portion and then the moisture evaporation occurs, and/or to protect the fine dust sensor from the steam cycle in which mist or steam is supplied into the clothing containing portion.

In order to protect the fine dust sensor, a sensor cover 58 may be provided according to the present embodiment. The fine dust sensor 56 may be provided inside the cabinet 10 or on the rear face of the door. Accordingly, the cabinet or the door may be provided with a mount 57 for mounting the fine dust sensor 56 thereon. The mount 57 may be embodied as a recess defined in the cabinet 10 or the door 300. The sensor cover 58 may be movably mounted with respect to the mount 57. That is, the sensor cover 58 may expose the sensor 56 toward the garment-containing portion or block the mount.

When the fine dust sensing is required, the mount may be opened using the sensor cover 58. When the find dust sensing is not required, the mount may be closed using the sensor cover 58. The sensor cover 58 may be configured to move left or right or up and down, or may be configured to slide. The sensor cover may be configured to swing.

A moving mechanism of the sensor cover 58 may be implemented in a wide variety of ways. This moving mechanism may not be the main feature of the present embodiment. Therefore, detailed description of the moving mechanism is omitted.

As shown in FIG. 1 and FIG. 3, a clothing managing apparatus according to one embodiment of the present invention may include a camera 45. The camera may be provided on the cabinet 10 or the door 300 and configured to generate image information of the clothing contained in the clothing containing portion.

In one example, the camera may be provided to capture image of the clothing stored in the inner casing 15 to generate image information. The camera 45 may include an image sensor and an illumination device. The lighting device may include an LED. The image sensor may be an RGB camera.

The camera 45 may be provided on the back or bottom face of the door 300. It is desirable to create a downward viewed image of the clothing as the clothing is hung downwardly from the hanger. Therefore, it is preferable that the camera is provided on a top of the rear face of the door 300.

In one embodiment, in the clothing managing apparatus according to one embodiment of the present invention, relative positions and angles of the clothing in the clothing containing portion relative to the position of the camera are likely to be within a predetermined range. Therefore, as described below, not only a type of clothing, but also whether the target clothing is wet with rain and whether the clothing is contaminated with fine dust may be determined using the camera 45. Thus, necessary treatment information including treatment course may be set based on the determined information.

The inside of the clothing containing portion may define an inner environment for the clothing treatment. This inner environment is different from the external environment. Especially, the temperature or humidity of the inner environment for clothing treatment is different from that of the external environment. The temperature or humidity of the inner environment may have an intended purpose. Thus, the intended temperature or humidity of the inner environment should be maintained. Therefore, it is common that such clothing treatment is performed in a state in which the door 300 is closed.

To this end, a door sensor 50 may be provided to sense the closed state of the door 300. The door sensor 50 may be provided in the door or a cabinet 1 corresponding to the door. In one example, when the door sensor 50 detects that the door is closed, the clothing treatment is performed.

The door sensor 50 may be provided in this embodiment. However, the door sensor 50 in the present embodiment may be provided not only for sensing the closed state of the door, but also for the triggering of the dust sensor and the triggering of the camera 45.

That is, the clothing weight sensing using the weight sensor and/or the fine dust sensing using the fine dust sensor and/or the image information generation via the camera 45 may be associated with a time point when the closed state of the door is sensed by the door sensor 50. In one example, when the door sensor 50 senses the closed state of the door, the camera 45 may generate image information.

When a high indoor fine dust concentration is detected, it means that the clothing also has a lot of fine dust attached thereon. Therefore, in this case, the step of sensing the fine dust may not require a preceding step, in one example, a step of vibrating the clothing. Therefore, the fine dust sensing may be performed automatically when it is detected that the door is closed. In another example, the image creation may be performed when it is detected that the door is closed.

However, when the step of sensing the fine dust requires the preceding step of vibrating the clothing, the fine dust sensing may not be performed automatically when it is detected that the door is closed. In this case, only image generation may be performed automatically when it is detected that the door is closed. Then, the fine dust sensing may be performed after the clothing vibration step is performed initially.

The determination of whether the clothing is wet may be performed early in the clothing treatment. Therefore, when it is detected that the door is closed, the weight sensing of the clothing may be automatically performed. At the same time, image generation may also be performed. When the clothing is wet, a drying or dehumidifying cycle is performed. The fine dust sensing may then be performed. At the termination of the drying or dehumidification cycle, the clothing is already dried and vibrated. Thus, a separate vibration cycle for the fine dust sensing may not be performed.

For the operation of the weight sensor 55, the fine dust sensor 56, the camera 45 and the door sensor 50, power must be applied to these components. The home appliances such as refrigerators are always powered. However, in general, the clothing managing apparatus may not be always powered.

Therefore, a sequential logic between power-up, door sensor operation, and camera operation (dust sensor operation) may be required. Such logic will be described later.

Hereinafter, a user interface that may be applied to the invention will be described in detail with reference to FIG. 4.

Figure 4:
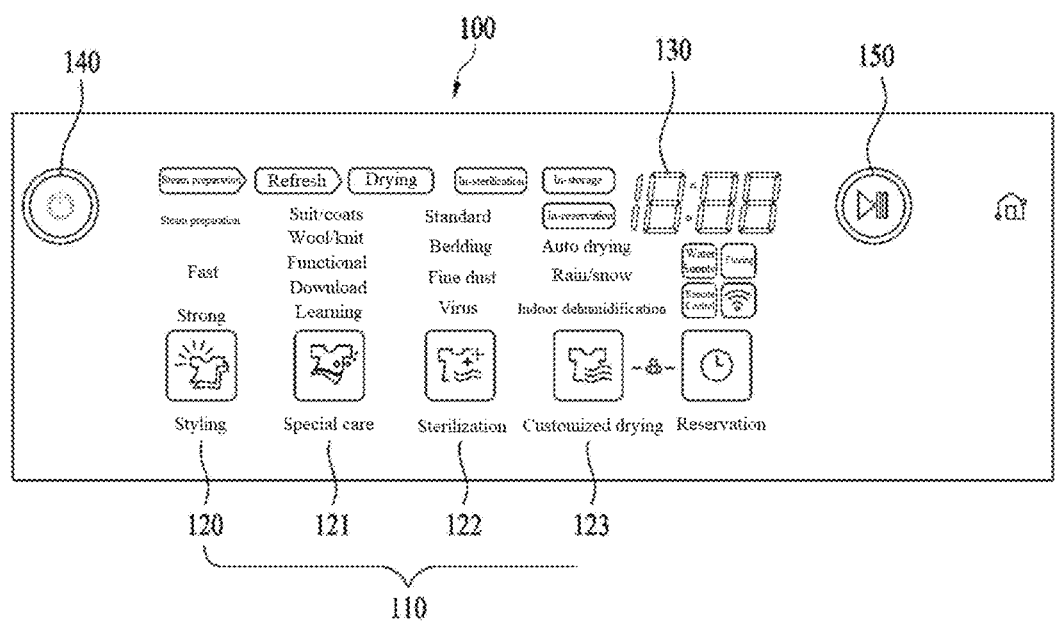
FIG. 4 is a front view showing an user interface of a clothing managing apparatus according to one embodiment of the present disclosure.

FIG. 4 shows one example of the user interface of the clothing managing apparatus.

For the clothing managing apparatus, the clothing treatment information may include course information. Such course information means an algorithm preconfigured for sequentially executing a series of processes for clothing treatment, for example, steaming, refreshing, drying, and sterilization processes. For each course, control parameters for the respective processes may be different from each other.

In a steam preparation process, air may be forcedly blown. In a sterilization process, fine dust and odors may be removed from the clothing and from the inside of the clothing containing portion.

Further, due to the nature of the clothing managing apparatus, drying or sterilization may be performed in each individual course. In other words, steam or refreshing process may be omitted from some courses.

Therefore, a plurality of course information may be defined. The plurality of course information may be defined according to kinds of the clothing or special functions. Further, each course information has sub-information or auxiliary information. Therefore, the clothing treatment information may include the auxiliary information as well as course information. In another example, specific course information may not include corresponding auxiliary course information.

The course information may be provided in a plural manner. Each course information may include a plurality of auxiliary course information. That is, a plurality of auxiliary courses may be provided for each primary course information.

Due to the nature of the clothing managing apparatus, the course information may include a plurality of primary course information according to purposes of clothing treatment and types of target clothing. FIG. 4 is one example having four primary course information.

A course selection interface 110 including a first course selection interface to a fourth course selection interface 120 to 123 is provided. The user may select a specific auxiliary course using the course selection interface. The auxiliary courses in the primary courses may be exclusive to each other. That is, an auxiliary course in a specific primary course and an auxiliary course in another primary course cannot be selected together. Rather, only one of an auxiliary course in a specific primary course and an auxiliary course in another primary course may be selected.

The primary course information may be identified using letters or by a region. In other words, sub courses corresponding to each primary course are gathered in a certain region. Each primary course can be distinguished from another primary course and its sub course.

A styling course may be selected using the first course selection interface 120. In other words, the user may select any of three sub courses in the styling course. The styling course may be performed such that steam is used to remove wrinkles, to perform odor removal, and so on. Thus, the styling course may include a steam preparation step, and a refreshing step to supply the steam to the clothing. Then, a drying process may be performed.

This styling course may be suitable for general clothing. The styling course may be suitable for dress shirts.

A special care course may be selected using the second course selection interface 121. In the special care course, the user may choose one of five sub courses. In addition, a new course may be downloaded and selected.

The special care course may be suitable for the clothing typically made of heat-sensitive materials. Therefore, the temperature control is more important in the special care course than in the styling course.

The hygienic sterilization course may be selected using the third course selection interface 122. In other words, in the sanitary disinfection course, the user may select one of four sub courses. The hygienic sterilization course may be configured to remove dust, viruses and odor from the clothing more effectively.

A customized drying course may be selected using the fourth course selection interface 123. That is, the customized drying course may be selected to dry wet clothing. The customized drying course may be configured to remove moisture and thus may be called as an indoor dehumidification course. The user may choose one of three sub courses in the customized drying course.

The above-mentioned styling course, special care course and hygienic sterilization course are designed for optimal treatment courses depending on one or more kinds and materials of target clothing. The styling course may be suitable for clothes of general-quality, the special care course may be suitable for a suit, wool, knit or functional clothing such as sportswear or outdoor wear. The hygienic disinfection course may be suitable for bedding, towels, and baby clothes.

When the user presses each of the specific course selection interfaces 120 to 123, the sub-courses of the specific course may be selected sequentially. In this case, the apparatus may indicate using LED lighting that a corresponding sub course is selected. In this embodiment, the clothing treatment information selected and set using the user interface may be referred to as main treatment information. The main treatment information may be set automatically via learning as described below.

In determining the usage pattern of the clothing managing apparatus, it is very easy to recognize target clothing using the image of the clothing. This is because the number of clothes being treated at one time in each of the courses of the clothing managing apparatus is small, and a size of the clothes being treated at one time in each of the courses of the clothing managing apparatus is relatively large. Therefore, it is very easy to recognize the target clothing. Further, the number and types of the clothes that the user may have, that is, which may be treated in each of these courses may be limited. Thus, learning thereof may be very easy and may result in highly accurate learning results. That is, treatment information may be automatically set via learning with high accuracy. Further, as described above, treatment information may be set with considering not only types of clothing, but also the condition of the clothing, such as whether it is wet with rain or contaminated with a lot of fine dust.

In one example, the aforementioned customized drying course may not be frequently used. That is, the aforementioned customized drying course may be selected in special cases. Thus, in the aforementioned customized drying course, the treatment target clothing may not be specified. Thus, in the customized drying course, the treatment information may not be automatically set via learning based on the target clothing.

In another example, the camera may be used to create an image having information of shapes, colors, materials, and lint of clothes as well as having information on water droplets and wet patterns on surfaces of the clothes. Therefore, treatment information can be automatically set via learning in a course for performing special functions such as drying as well as via learning based on the type of the clothing.

Therefore, when necessary, one course information among a plurality of course information for the clothing managing apparatus may be automatically set via learning, while another course information among the plurality of course information may not be automatically set via learning.

Further, when necessary, one sub course information among the plurality of the sub-course information may be automatically set via learning, while another sub course information among the plurality of sub course information may not be automatically set via learning.

In one example, an indoor dehumidification course is an irrelevant course to clothing treatment. The indoor dehumidification course may be designed for the dehumidification of the room where the clothing management apparatus is placed, or the dehumidification of the clothing containing portion itself inside the cabinet. That is, the clothing managing apparatus may function as a separate dehumidifier. Thus, when the indoor dehumidification course is selected, it is preferable that the learning is not performed.

Nevertheless, in this case, when the door is closed and the indoor dehumidification course is selected, the camera may create an image. In the indoor dehumidification course, the learning is excluded. Thus, there is no treatment information corresponding to the acquired image. Therefore, in this case, it is desirable to use an alarm to guide the user to withdraw the clothing from the clothing containing portion.

A display 130 is shown in FIG. 4. The display 130 may be provided to indicate a remaining time, a current cycle or treatment process. In one example, the display 130 indicates steam preparation, refreshing, drying, in-sterilization, in-storage and in-reservation.

When each primary course and sub course are selected, a LED provided at a rear of the display is turned on to display the selected information.

In one example, the control panel 100 may include a power input interface 140 for powering on and off the clothing managing apparatus, and a start/pause selection interface 150 for starting or pausing operations of the clothing managing apparatus. The start/pause selection interface may be referred to as a start input interface for convenience.

Thus, the user inputs clothing treatment information using the course selection interface 110. The clothing treatment is performed according to the entered treatment information. Such a series of processes may be referred to as a manual setting mode. This is because the user directly selects and inputs the target clothing treatment information.

One example of the manual setting mode is as follows.

The user opens the door 300, and puts clothing in the cabinet and closes the door 300. After applying power using the power input interface 140, the user may press the course selection interface 110 to select the sub course "Strong" in the styling course 120.

When the inputting of the clothing treatment information is terminated, the user may push a start input interface 150. Then, the clothing managing apparatus automatically treats the clothing based on the input treatment information (main treatment information, or main treatment course), and terminates the treatment of the target clothing. In the sub course, refreshing and drying using strong steam (steam of a maximum temperature achieved by the steam and a maximum steam amount) may be performed sequentially.

In this invention, the present apparatus may provide not only the manual setting mode described above, but also a semi-automatic setting mode in which an automatic setting mode is added to the manual setting mode. In particular, the present apparatus may consider the amount or level of fine dust sensed using the fine dust sensor to change one or more values of control parameters of the main treatment information. In other words, the present apparatus may automatically change the main treatment information selected by the user based on an amount or level of fine dust sensed.

When it is determined that the clothing is dry based on the weight of the clothing sensed using the weight sensor, or that the amount of fine dusts detected using the fine dust sensor is very small, the present apparatus may perform the clothing treatment based on the main treatment information selected by the user. However, when it is determined that the clothing is wet based on the weight of the clothing sensed using the weight sensor, or that the amount of fine dust detected using the fine dust sensor is large, the present apparatus may perform the clothing treatment based on modified main treatment information modified based on the sensing result. In other words, the basic conditions or control parameters may be changed automatically to allow the fine dust removal to be more effective.

The present embodiment may provide a clothing managing apparatus which may implement the automatic setting mode as well as the manual setting mode as described above. That is, the clothing managing apparatus may be provided that may automatically set the clothing treatment information without the user having to input the clothing treatment information every time the user desires the clothing treatment.

In particular, the present embodiment may provide the clothing managing apparatus evolving while performing the learning. The present invention may provide a clothing managing apparatus that may increase the user's satisfaction by allowing the user to know whether the learning is done and whether the appliance has evolved.

In the present embodiment, the clothing managing apparatus may be learned using the image information of the clothing as received in the clothing containing portion in a hung manner and then set the clothing treatment information using the leaning result. That is, even when the user does not input the treatment information manually, the clothing managing apparatus can set the treatment information by reflecting the learning result.

While the user is using the clothing managing apparatus in the manual setting mode (or semi-automatic setting mode), the clothing managing apparatus may continue to learn the responses from the user. In other words, the learning process may be performed using image information obtained using the camera 45 and responses from the user obtained using the user interface. Details of the learning process will be described later.

A course that is set by reflecting the results of the learning process may be called a learning-based course. A mode in which treatment information is set using the learning-based course may be referred to as a learning-based setting mode. The learning-based setting mode may mean a mode in which, unlike the manual setting mode as described above, the treatment information is automatically set even when the user does not input the treatment information manually. In another example, the main treatment information, which is recommended and approved in either the automatic setting mode or the learning-based setting mode, may change. That is, the main treatment information may be automatically set without being changed, or may be changed and set automatically, depending on the amount or level of fine dust detected.

In one example, when the user chooses a learning-based course using the high-quality clothing selection interface 121 as the second course selection interface, the present apparatus may use the learning-based setting mode by default.

One example of the learning-based setting mode is described below.

The user opens the door 300 and puts the clothing in the cabinet and closes the door 300. The user may use the power input interface 140 to apply power to the apparatus and then select the learning-based course. When the door 300 is closed and the power is applied, the camera 45 may automatically generate image information on the current received clothing. Then, the apparatus may remove the fine dusts from the clothing by vibrating the clothing. The present apparatus may then use the fine dust sensor to sense the amount of fine dusts.

Once the learning-based course is entered, current treatment information may be set using the current learning result and the currently acquired image information. That is, the treatment information may be set without the user entering the treatment information. When the amount of fine dusts is negligible, the current treatment information may be set in a non-modified state. However, when the amount of fine dust is large, the current treatment information may be set in a modified state. That is, a logic for the fine dust removal may be added to the existing control logic. As the amount of the fine dust increases, the intensity of the fine dust removal may be set to be higher.

In this connection, it is desirable to let the user know that the treatment information set is the treatment information reflecting the learning result. That is, it is desirable that the user recognizes that the treatment information corresponding to the current image is set using the result of the learning based on the image information. More specifically, it is desirable to let the user know that the treatment information set is the treatment information reflecting the fine dust level. Further, it is desirable that the user recognizes that the treatment information corresponding to the current image is set using the result of the learning based on the image information currently obtained using the camera.

For this purpose, it is desirable to display the process of outputting the learning result for about 1 second to about 2 seconds so that the user can recognize the learning result. Further, the outputting means may indicate to the user that the weight sensing is being performed for approximately 10 seconds. The outputting means may indicate to the user that the fine dust sensing is being performed for approximately 10 seconds. In one example, this indication may be done using the display 130. Alternatively, the plurality of LEDs may be selectively turned on or off. Alternatively, only the LEDs corresponding to the set treatment information may be turned on. Further, the indication may be done via the voice using the speaker.

The user may approve the set treatment information using the start input interface 150. Alternatively, the user may approve the set treatment information using voice input via a microphone.

When the approval step is completed, the treatment of the clothing may be performed based on the set treatment information.

In one example, the user may disapprove the treatment of clothing with reflecting the weight information of the clothing or the fine dusts information in the approval step.

Further, the user may input new treatment information without approval at the approval stage. In this case, forced learning may be performed using the currently acquired image information and newly input treatment information. In other words, injected learning or forced learning by the user may be performed. The results of such injected learning or forced learning may be prioritized over the learning result from other learning processes. In other words, the learning results from the forced learning may be prioritized over the learning results acquired using the manual setting mode. When reflecting the priority of the learning result into the clothing managing apparatus, the user may be aware of whether the clothing managing apparatus has evolved via learning.

When the learning-based setting mode is performed after the learning-based course was selected immediately before, the learning-based course may be selected by default. That is, as long as the user does not re-select the learning-based course, the selection of the learning-based course may be maintained. Even when the power is turned off after the clothing treatment using the learning-based course is finished, the learning-based course may be selected by default when the power is again turned on.

Therefore, the learning-based course may be activated by selecting at least one of the first course selection interface to the third course selection interface. Alternatively, a separate selection interface may be associated with the first course selection interface to the third course selection interface. In this case, when the separate course selection interface is selected by the user, a specific course in the first to third course selection interfaces may be set automatically based on the clothing in question.

In one example, the fourth course selection interface is a course selection interface for manual selection only. Thus, the fourth course selection interface may be independent of the learning-based course and may be independent of the learning and image generation. Therefore, it is recommended that image generation not be performed when a course is selected using the fourth course selection interface. That is, the process for learning may not be performed.

In one example, in an early time when the clothing managing apparatus is not used frequently, the number or types of learning results may be small. Therefore, the learning result corresponding to the currently obtained image information may not exist.

Thus, a process of determining the presence or absence of sufficient learning results may be performed in a learning-based setting mode.

When there is a learning result, the corresponding treatment information thereto may be output and may be set. On the other hand, when there is no learning result, the appliance may notify the user of the absence of learning result. When the appliance is to wash new clothing that was not previously washed, there will be no corresponding learning results. Thus, in this case, the user may be aware that the clothing managing apparatus intends to receive new information for learning. Therefore, the user may notice that the clothing managing apparatus is evolving.

When there is no learning result, the appliance may not only notify the user of the absence of learning result, but also guide the user to input treatment information or suggest similar treatment information to the user. That is, even when there is no treatment information corresponding to the currently acquired image information, the most similar treatment information may be proposed to the user. In this case, the approval step may be performed as described above. In this connection, the forced learning step may be performed.

The learning-based course selection interface may be provided separately from the course input interface 110. Alternatively, the learning-based course selection interface may be provided as a part of the course input interface 110. In the latter case, the selection of the learning-based course and reflection thereof into the appliance may be as described above.

The learning-based course selection interface may be present to allow the user to select the manual setting mode or the learning-based setting mode. When the user avoids using the manual setting mode from the beginning of use of the clothing managing apparatus but prefers the automatic setting mode, this learning-based course selection interface may be omitted.

That is, when a sufficient amount of learning results is prepared or a learning result corresponding to the currently acquired image exists, the learning-based setting mode may be performed. To the contrary, when a sufficient amount of learning results is not provided or there is no learning result corresponding to the currently acquired image, the above-described forced learning may be performed.

In the forced learning, the user must input treatment information manually. However, in this case, the user may notice, using the user interface, that the clothing managing apparatus is learning and evolving to perform the learning-based setting mode. Therefore, the user may not only perform the clothing treatment using the clothing managing apparatus, but also help the appliance evolve and thus observe that my own clothing managing apparatus is evolving in accordance with the user's intention and thus have fun with it. This fun may be further enhanced when using the voice. Therefore, the user interface may preferably include a microphone and/or speakers.

The user interface 100 may include a display indicating a fine dust level or amount. FIG. 4 shows four fine dust levels in one example. The more fine dust detected, the higher the level is. The less fine dust detected, the lower the level is. In another example, a separate display may be used to display the fine dust level. Thus, the user may view the user interface 100 to recognize the amount of fine dusts.

When, at the beginning, the fine dusts sensor 56 may detect the fine dust, the fine dust level may be a level 4. In this connection, a LED corresponding to the level 4 may be turned on. When the clothing treatment is terminated, the fine dust sensor 56 may re-detect fine dust. At this time, the fine dust level may be changed to a level 1. In another example, the change in the level of the fine dust may be indicated using voice or text. Thus, the user may intuitively perceive that the clothing managing apparatus has effectively removed fine dust.

In one example, fine dust removal may not be required in seasons having the lower dust level. In this case, it may be unnecessary or unreasonable to cause the fine dust to be sensed automatically or by default, and to activate the fine dust removal logic based on the sensing result. Accordingly, the user interface 100 may have a fine dust selection interface 124. The fine dusts selection interface 124 may be applied in the same manner as the learning course selection interface as described above.

That is, when the user selects the fine dusts selection interface 124, fine dusts may be subsequently sensed by default and then the sensing result may be reflected to set the treatment information. When the user deactivates the fine dusts selection interface 124, the fine dusts will not be sensed subsequently.

A user who is very sensitive to fine dusts may use the fine dusts selection interface 124 to allow the fine dusts sensing to be performed by default and the sensing result to be reflected. Conversely, a user sensitive to fine dusts only in specific seasons may use the fine dusts selection interface 124 to allow the fine dusts sensing to be performed by default only in specific seasons, and the sensing result to be reflected. Therefore, the present apparatus may cope with the characteristics of various users very flexibly.

Figure 5:
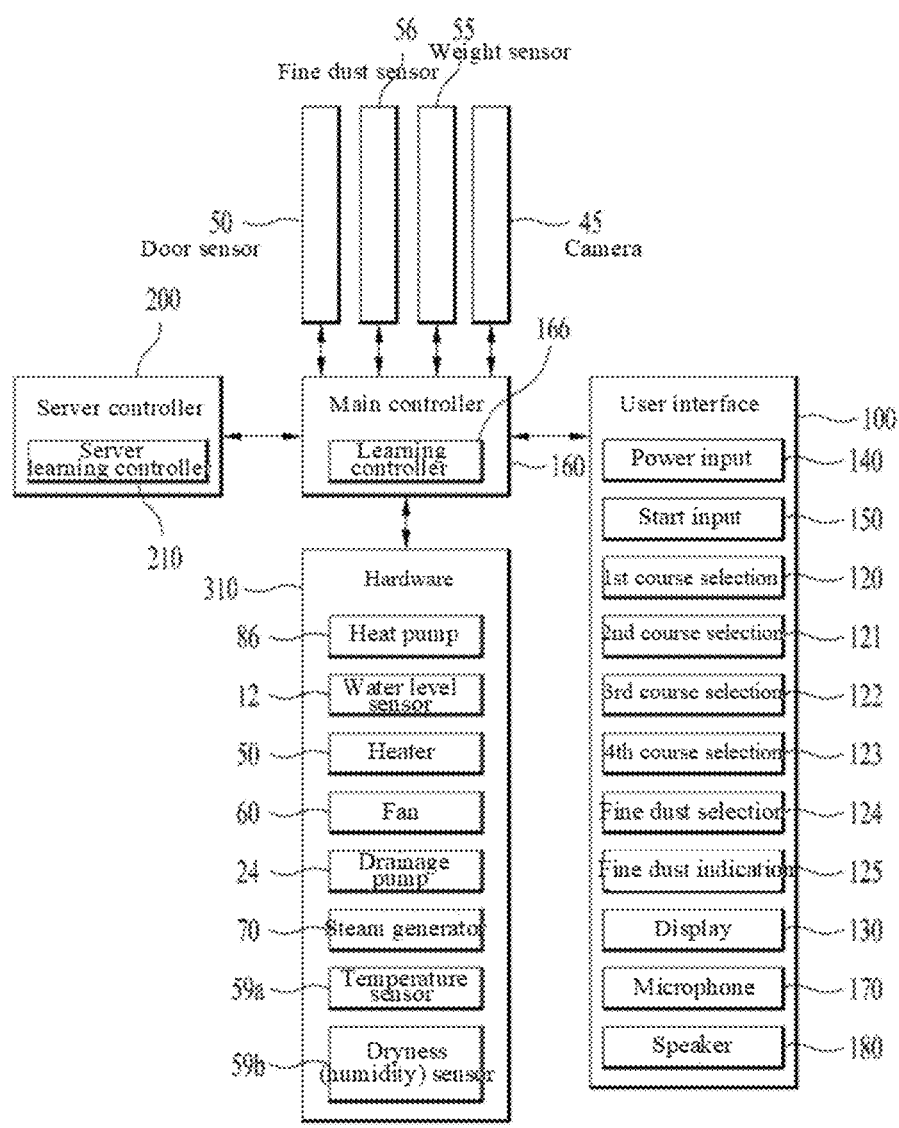
FIG. 5 is a control block diagram of a clothing managing apparatus according to one embodiment of the present disclosure.

Hereinafter, a control arrangement of the clothing managing apparatus according to one embodiment of the present invention will be described in detail with reference to FIG. 5.

The clothing managing apparatus may include a main controller or main processor 160 that controls a series of processes of the clothing treatment. The main controller 160 controls the driving of the hardware 310 to perform the set treatment information. The hardware 310 may be differently configured between various clothing managing apparatuses. The hardware may include a steam generator 70. The hardware may include a water level sensor 12 for sensing a water level in the steam generator or a water level of a water tank for supplying water to the steam generator or a water level of a drain tank, and a heater 50. The heater 50 may be replaced with a heat pump 86.

When there is no drain tank, a separate drain pump 24 may be included in the hardware. A separate heater 50 or fan 60 for drying may be included in the hardware.

The clothing managing apparatus according to the present embodiment may include a temperature sensor 59a. The temperature sensor 59a may be configured to sense the temperature of hot air or the temperature inside the clothing containing portion. The temperature sensor may be present such that the temperature inside the clothing containing portion does not exceed a target temperature due to hot air or steam.

The temperature sensor 59a may be used to detect a temperature change within the clothing managing apparatus. During drying, a pattern of the temperature change inside the clothing containing portion may vary. When drying is performed intensively, a width of the temperature change becomes small. The temperature change width becomes large at the time of termination of the drying. Thus, the temperature sensor may be provided to sense the target temperature and then stop the supply of hot air or steam based on the sensing result. The temperature sensor may be provided to determine the drying termination timing.

The clothing managing apparatus according to this embodiment may include a dryness (humidity) sensor 59b. The dryness sensor may be configured to sense the dryness level (humidity) inside the clothing containing portion using air circulation. The dryness sensor may be used to determine whether the drying process is to continue or is to be terminated. Further, the controller may determine whether the drying process is necessary, based on the sensing result of the dryness sensor.

In one example, the hardware 310 may include a driver for vibrating the hanger 400 or the support rod for the removable hanger, or a driver for moving the sensor cover. The main controller 160 may control the operations of these various hardware devices according to control logic or control flow.

A learning controller or a learning processor 166 for performing learning and outputting a learning result may be provided. The learning processor 166 may be provided separately from the main processor or may be embedded in the main processor. The learning processor 166 may be programmed with the learning algorithm or learning logic as described below. Further, the fine dusts control logic may be programmed into the learning processor. In another example, the fine dust control logic may be programmed in a separate processor. The number of the fine dust control logics may be based on the fine dust level. In addition, the fine dusts control logic may be updated. In one example, the present apparatus may download updated fine dust control logic from the server.

The image information generated using the camera 45 and the treatment information input using the user interface 100 from the user may be transmitted to the main controller 160. Further, the fine dusts information obtained from the fine dust sensor 56 may be communicated to the main controller 160.

The image information and treatment information delivered to the main controller 160 may be forwarded to the learning controller 166. In another example, it is also possible that at least one of the image information and the treatment information may be passed directly to the learning controller 166. Further, the main controller 160 may recognize the fine dusts information and determine whether the fine dusts control logic is to be activated. The main controller 160 may recognize the fine dusts information and determine one of a plurality of control logics to be activated.

The main controller 160 may detect whether the above-described learning-based course selection interface or the fine dusts selection interface is set by default. When the above-described learning-based course selection interface or the fine dust selection interface is set by default, the main controller 160 may allow the above-described learning-based course selection interface or the fine dust selection interface to be set by default. When the above-described learning-based course selection interface or the fine dusts selection interface is not set by default, the main controller 160 may disallow the above-described learning-based course selection interface or the fine dust selection interface to be set by default.

The learning process may be performed by the learning processor 166 to receive the image information as an input and to output the treatment information as output information.

Further, there are a lot of smart clothing managing apparatus that communicate with servers in recent years. That is, the clothing managing apparatus is provided with a communication module (not shown) to communicate with the server. Accordingly, the learning processor 166 may be omitted from the clothing managing apparatus, but the server controller 200 may be provided with a server learning controller or processor 210.

That is, the input parameters for the learning process are transmitted from the clothing managing apparatus to the server. Then, the server may perform learning based on the input parameters and then deliver the learning results to the clothing managing apparatus. In this case, the clothing managing apparatus does not require a separate learning processor, so the product cost of the clothing managing apparatus may be lowered.

On the other hand, when the user wants own clothing managing apparatus or a clothing managing apparatus customized for the user, it may be desirable for the clothing managing apparatus to have a separate learning processor 166. In other words, a unique and personalized clothing managing apparatus may be provided to a specific user. Similarly, the type of clothing that a user treats using the clothing managing apparatus varies from user to user. Therefore, the fine dust removal logic may preferably be embedded in the clothing managing apparatus rather than the server.

The clothing managing apparatus includes the user interface 100. Inputting and outputting of the treatment information may be performed using the user interface 100. The specific configuration of the user interface has been illustrated in FIG. 4 in one example.

Various input interface or selection interfaces 140, 150, 110, and 124 in the user interface 100 may be configured for a user to physically select or input the input interface or selection interfaces. Alternatively, the various input interface or selection interfaces may be provided in any form of a button or a touch panel such that the input interface or selection interfaces may be input or selected via physical contact or pressurization. The input or selection interface may be embodied as a touch menu in the touch display.

However, the power input interface may be preferably provided in the form of physical buttons in a separate manner from the other input interfaces, for reasons of user experience or reduction of the standby power. In other words, the power input interface may be provided in the form of a mechanical power switch. It may be desirable that the starting input interface 150, which faces the power input interface 140, may be provided in the form of a physical button as well.

The user interface 100 according to this invention may be provided with the fine dust selection interface 124 and/or a fine dust level display interface 125 as described above. The fine dust level display interface 125 may visually indicate the amount or level of fine dust to the user to increase the user's satisfaction.

Hereinafter, a control method according to one embodiment of the present invention will be described in detail with reference to FIG. 6. This embodiment may perform the fine dust treatment logic by default. In addition, the wetting treatment logic of clothing may be performed prior to performing such fine dust treatment logic. When a wet sensor is used to detect the clothing wetting, a drying or dehumidification cycle may be performed first.

When power is applied to the clothing managing apparatus S1 and the door closing is detected S2, steps S3 to S6 for sensing the fine dusts may be performed. When the wetting treatment logic is applied, the wetting treatment logic is applied after the door closing is detected. A step for sensing the fine dust may then be performed.

The step for sensing the fine dust may be performed by default. Alternatively, when a selection of the fine dust selection interface 124 is carried out as described above, the step for sensing the fine dust may be performed.

The fine dust detection S4 may be performed using a fine dust sensor 56. The fine dust sensing may be performed after the sensor cover 57 for protecting the sensor 56 is opened S3. After performing the fine dust detection S4, the amount or level of fine dust detected may be displayed on the user interface S5. Thereafter, the sensor cover 57 may be closed S6 to protect the fine dust sensor S56.

The step for sensing the fine dust may be performed before the treatment of the clothing. A cycle of vibrating the clothing may be performed before the step for sensing fine dust. Specifically, a cycle of vibrating the clothing may be performed after the sensor cover is opened S3. The vibrations of clothing may be achieved by applying strong wind to the clothing or by vibrating the removable hanger. This vibration cycle may be intended to detect fine dusts rather than to achieve fine dust removal. During or after the cycle of vibrating the clothing, the fine dusts may be detected S4.

When the steps S3 to S6 for sensing the fine dust terminate, it may be determined whether to reflect the amount or level of the sensed fine dust. The level of fine dust may be divided stepwise. Based on each level, a corresponding logic among the plurality of fine dust removal logics may be selected. In another example, when the amount of fine dust is small, the fine dust removal logic may not be applied.

When the amount of fine dust is significant, the main processor will apply the fine dust removal logic. That is, the main treatment information set by the user or the main treatment information set by the learning may be modified. The main treatment information may be modified by adding the fine dust removal logic to the default main treatment information. Further, the main treatment information may be changed by reflecting the fine dust removal logic to the default main treatment information.

In one example, the user interface may be used to inform the user whether to perform the fine dust sensing before the fine dust sensing. The user may use the user interface to approve the fine dust sensing. Further, the user interface may tell the user whether to reflect the fine dust level after the fine dusts are sensed. The user may approve whether to reflect the sensed fine dust information using the user interface.

The main controller treats the clothing S7 based on the modified main treatment information. In one example, the main controller is configured to allow a fine dust removal process to be performed before a specific course as selected by the user or set via learning is performed. Then, the main controller is configured to allow the specific course to be modified with considering the result from the fine dust removal process.

When the clothing treatment S7 is terminated, the fine dust sensing S8 may be performed. In this connection, the sensor cover may be opened and closed. However, the separate process of applying the vibration to the clothing for sensing the fine dusts may not be performed.

Fine dust levels before and after the clothing treatment S7 may be displayed respectively. Thus, the user may intuitively perceive the effect of the fine dust removal.

Hereinafter, referring to FIG. 7, a control method according to one embodiment of the present invention will be described in detail. The embodiment includes the control method of FIG. 6, and may further include a learning process.

When power is applied to the clothing managing apparatus S10 and the door closing is detected S20, image information is generated and obtained using the camera S30. Before that, during or after the image information acquisition S30, the fine dust acquisition and display S25 may be performed. The S25 step may include S3 to S6 as described using FIG. 4.

The image information generated by the camera should be image information about the current clothing received for clothing treatment in a hung manner.

The user may insert the clothing after supplying the power first. When the clothing insertion is completed, the door is closed. Conversely, a user may feed power in a state in which the user has inserted the clothing and then has closed the door.

In any case, it is desirable that the power supplying S10, the door closing detection S20, and the image information acquisition S30 are sequentially performed. When a subsequent step is not performed within a predetermined time after the image information acquisition step S30, the power is automatically turned off, and a termination step S80 may be performed. In this connection, the acquired image information may not be used for learning.

When the image information is acquired S30 and the fine dust level information is obtained, a step S40 may be performed in which the apparatus obtains treatment information set by the user or sets treatment information by learning. Further, the main treatment information may be modified to reflect the fine dust information.

In the manual setting mode as described above, in this step S40, the treatment information that the user manually inputs is obtained by the main controller. This treatment information together with the currently acquired image information will be used for learning S50. However, as long as this manual setting mode continues, the learning may be performed but the learning result may not be reflected into the machine. When the fine dust information is reflected, the main treatment information input manually by the user may be changed and set.

When the user approves the manually set main treatment information using the voice or start input interface, the main controller 160 performs clothing treatment based on the main treatment information. When the clothing treatment is completed, the main controller executes shutting the power off to terminate the clothing treatment S80. In another example, when the clothing has been treated with reflecting the dust information, the display may indicate the fine dust level after the treatment.

The learning S50 may be performed in parallel with the clothing treatment during the clothing treatment.

In one example, as described above, in the clothing managing apparatus, the clothing treatment information may include the sub information as well as the primary course information.

Coat and suit with relatively large volumes may be classified into the same type of clothing. Thus, the clothing treatment for coats and suits may be performed using a suit/coat course.

Various image information about the coats and suits may be input to the controller and the coat/suit course may be set automatically via learning. When a course specialized for fur, etc. is not provided, the forced learning mode may be executed to activate the "Download" course to allow various image information about fur clothing to be input to the apparatus in a downloaded manner and then allow the course specialized to fur, etc. to be set automatically.

In one example, the fur treatment may be performed in the coat/suit course. In this case, although not shown in FIG. 4, a selection interface may further be provided which may allow the user to select sub information about hot air temperature, steam presence or absence, wind intensity, vibration intensity, and so on. In other words, when the user selects the fur-optimized sub information together with the coat/suit course, the present apparatus may learn this use pattern of the user.

When the apparatus treats the fur clothing in a standard styling course based on the learning result, thermal damage to the fur may occur. This damage may be detected based on changes in temperature around the fur clothing. Therefore, in this case, correction of the current treatment information set based on the learning result may be necessary. Therefore, it is desirable that a step S70 may be performed to determine whether correction of the current treatment information set via the learning is necessary during the clothing treatment or before completion of clothing treatment.

Such correction may be performed to correct and modify the primary information, that is, the course information itself, or to correct and modify various sub course information or sub option information.

When the correction is required, such correction information (in one example, a predetermined low hot air temperature and steam non-use among the treatment information currently set by the learning) may be reflected in the learning process S50.

In addition, when the target clothing is dropped on the floor during the shaking operation of the clothing for dust removal of the target clothing, the clothing image obtained from the camera may contain the dropped state. In this case, the apparatus may modify the current treatment information.

Whether the correction is executed and the correction information is reflected may be informed to the user using the user interface before or during the clothing treatment.

In one example, the correction may be applied to the fine dust control logic. In one example, when the fine dust level of the specific clothing is a level 3, a fine dust control logic corresponding to the level 3 may be applied to perform the clothing treatment. A satisfactory fine dust removal may not be performed after the clothing treatment. Therefore, when the fine dust level of the specific clothing is the level 3 after the correction is performed, a fine dusts control logic corresponding to a level 4 may be subsequently applied.

In addition, the clothing treatment information may be delivered to the server in communication with the clothing managing apparatus. The server may analyze this clothing treatment information to update the fine dust control logic. That is, the server may update the current logic with a fine dust control logic of stronger dust removal capability. The update information may be transmitted to a terminal (in one example smartphone) that is associated with the clothing managing apparatus. Thus, the user may use the terminal to identify the update information and approve or disapprove the same. When the user approves the update information via the terminal, the server sends the update information to the clothing managing apparatus. Then, the clothing managing apparatus may download the updated fine dust control logic.

Each time the user performs a treatment of specific clothing, the user may feel that the clothing managing apparatus evolves every time.

Therefore, the termination S80 of the clothing treatment is preferably performed only after the clothing treatment process, the learning process, and the user notification process are all completed.

In the learning-based setting mode as described above, in the step S40, the treatment information is automatically set using the learning result and the currently acquired image information. In another example, the treatment information modified to reflect the fine dust information may be automatically set.

When there is a learning result that matches the currently acquired image information, the corresponding treatment information is output. The output treatment information may be modified to reflect the fine dust information such that the modified treatment information may be set automatically.

It is desirable for the user to be aware that the setting of the treatment information is based on the learning. The user interface may be used to allow the user to recognize that the setting of such treatment information is based on the learning. Alternatively, the LED display units turn on in a variable manner and only then the set LED display unit turns on. Alternatively, the display is used, or the voice output using the speaker is used such that the user is aware that the setting of the treatment information is based on the learning. Thus, the user may intuitively recognize that the treatment information is set based on the learning result.

The clothing treatment S60, correction or non-correction determination step S70, learning step S50, and the like may be performed in the same manner according to the set treatment information.

As described above, in the step S40, the manual setting mode and the learning-based setting mode may be performed differently according to the selection of the user or may be performed differently depending on the number of learning results. In another example, the manual setting mode and the learning-based setting mode may be performed differently depending on whether the user selected the fine dust selection interface.

In the manual setting mode, the learning may be continued but the learning result may not be reflected. Thereafter, when the user selects the learning-based setting mode, the learning-based setting mode may be used while reflecting the learning results.

When the learning-based setting mode is performed by default, the forced learning may be executed at the beginning of the use of the clothing managing apparatus when the learning results are not sufficient. When the learning results are sufficient, the treatment information may be set automatically. When image information for each of the treatment information provided is obtained, the appliance may perform true learning via image augmentation.

This will be described later.

In another example, in the learning-based setting mode, the user approval process/step or the forced learning or injected learning step may be performed in the same way as above.

The learning process in the present embodiment may refer to a process of increasing the number of combinations of image information distinguished from each other and treatment information corresponding to each image information to be output.

In the clothing managing apparatus, the type and number of clothes that a particular user may wash using the clothing managing apparatus may vary in a certain range. The old clothing may be discarded when new clothing or clothes is purchased. Thus, a limit of the number and types of the clothes may be at a predictable level. Especially, the type and number of clothes in the clothing management apparatus will be relatively small because the clothing management apparatus is used to manage or treat the clothing which is not suitable for washing in the clothing washing machine.

Therefore, the number of combinations of the image information predictable by the clothing managing apparatus of a specific user and the corresponding treatment information may increase gradually, but may increase only to a predictable level. In other words, the predictable level of the number of combinations may be determined by the appliance without decreasing the performance of the clothing managing apparatus itself.

Conversely, in case all possible combinations of image information about all clothes that may be washed and the treatment information corresponding thereto are pre-created into a database, the database may not need to be extended via learning and thus the machine may not need to evolve. Further, there is a great difficulty in creating the database of such a tremendous number of combinations. When the clothing managing apparatus itself has the database embedded therein, this may cause overloading of its own processor. When the server has the database embedded therein, this may take an excessive amount of time to transfer the information.

Therefore, it would be desirable to be free of an initial data base but to extend the database in a specific manner for the specific user via the learning process. In addition, it is desirable that the learning itself is performed in the clothing managing apparatus or server, but the database of the learning results may be managed by the clothing managing apparatus itself.

Hereinafter, a control method according to one embodiment of the present invention will be described in detail with reference to FIG. 8. In this embodiment, the learning-based setting mode and the manual setting mode may be clearly distinguished from each other.

Figure 6:
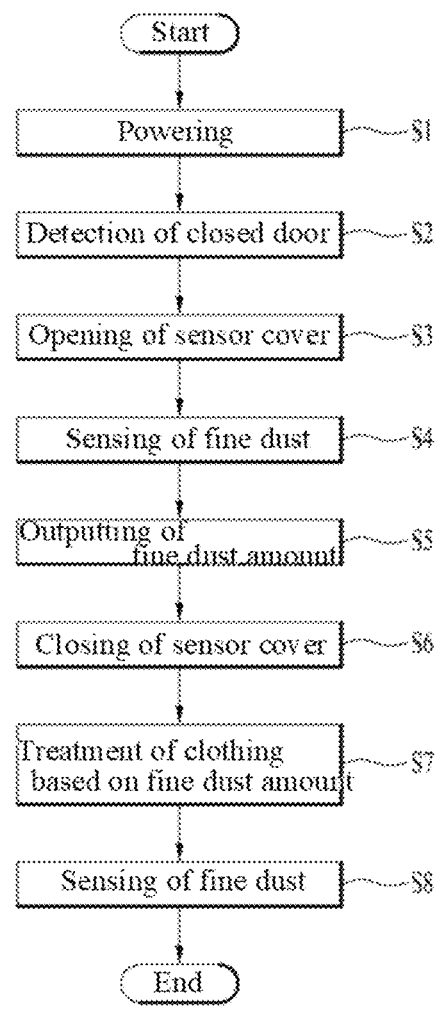
FIG. 6 is a flow chart showing a control method of a clothing managing apparatus according to one embodiment of the present disclosure.
Figure 7:
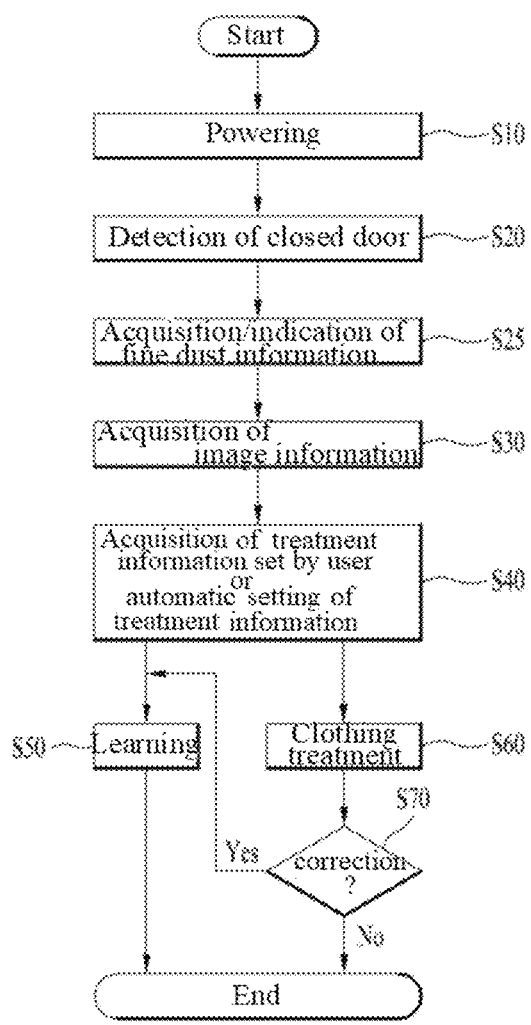
FIG. 7 is a flow chart showing a control method of a clothing managing apparatus according to another embodiment of the present disclosure.

First, the power supplying S110, door closing detection S120, fine dust information acquisition S125, and image information acquisition S130 steps may be the same as the embodiments shown in FIG. 6 and FIG. 7.

After the image information acquisition step is performed, a step S140 is performed to determine whether to proceed with the learning-based setting mode or the manual setting mode. In another example, the door determination and/or image information acquisition steps may be performed after the determination step S140 is performed.

When a user chooses a learning-based setting mode via a learning-based course input or the like, the learning-based setting mode may be performed. The learning-based course input may be performed variously using the user interface. Further, the learning-based course may be set as the default course. In this case, the learning-based setting mode may be performed. When the previous mode of the clothing managing apparatus is a learning-based setting mode, the learning-based setting mode may be set by default for following operations of the apparatus. When the learning-based setting mode is not selected or is not set to the default mode, the manual setting mode may be performed.

When the learning-based setting mode is performed, a step S143 of determining the presence or absence of the learning result may be performed. That is, it may be determined whether clothing treatment information corresponding to the currently acquired image information may be output. Upon determination that there is a learning result useful for the clothing treatment information, the clothing treatment information corresponding to the currently acquired image information is automatically set S144 based on the learning result. Then, the clothing treatment S160 is performed based on the set clothing treatment information.

In one example, a step S145 may be performed in which the user approves the set clothing treatment information. The user may identify the clothing treatment information set using the user interface. Then, the clothing treatment information may be approved by the user. The user approval may be performed using the user interface, for example, selecting a startup input interface, using a voice. Alternatively, the clothing treatment information may be approved when the user does not input any additional input or response during the preset time duration.

In another example, the user may disallow the set clothing treatment information. Likewise, the set clothing treatment information may be disapproved using the voice or disapproved by the user entering new clothing treatment information S146. When the user enters the new clothing treatment information while disapproving the set clothing treatment information, the learning may be performed S147. In this case, the learning may be called the forced learning.

That is, while ignoring the currently acquired image information and the clothing treatment information set according to the previously learned result, the appliance may perform a new learning. The clothing treatment information input by the user in the forced learning mode may be given priority over the clothing treatment information input by the user in the general learning mode.

Thereafter, the clothing treatment is performed S160 based on the clothing treatment information input by the user.

Upon determination that there is no learning result, the notification S148 may be performed. The appliance may use a voice or display to tell the user that there are no learning results. Alternatively, the apparatus may tell the user to input the clothing treatment information.

When the user inputs the clothing treatment information S149, the learning S150 may be performed. In this case, the learning may be called the general learning rather than the forced learning.

Thereafter, the clothing treatment is performed S160 based on the clothing treatment information input by the user.

Upon determination from the determination step S140 that the current mode is the manual setting mode, the user inputs the clothing treatment information S141. Then, the learning is performed using the currently acquired image information and the clothing treatment information input by the user. This learning may be called the general learning rather than the forced learning. Then, the clothing treatment is performed based on the clothing treatment information input by the user.

Figure 8:
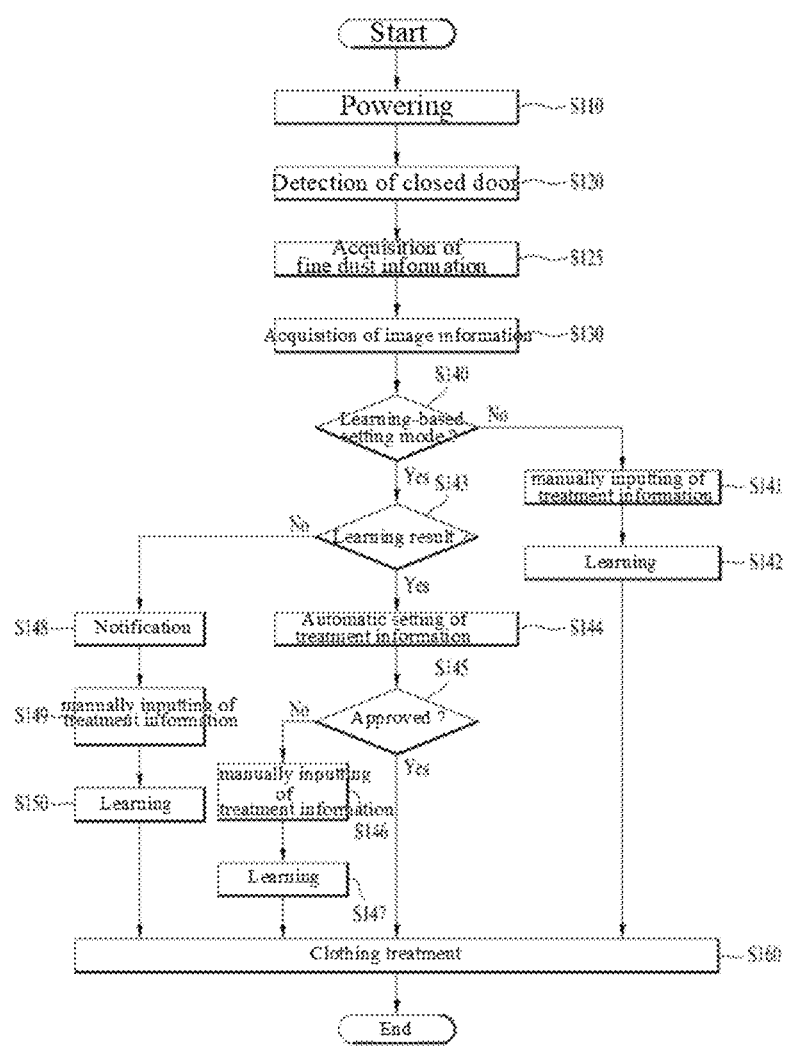
FIG. 8 is a flow chart showing a control method of a clothing managing apparatus according to another embodiment of the present disclosure.
Figure 9:
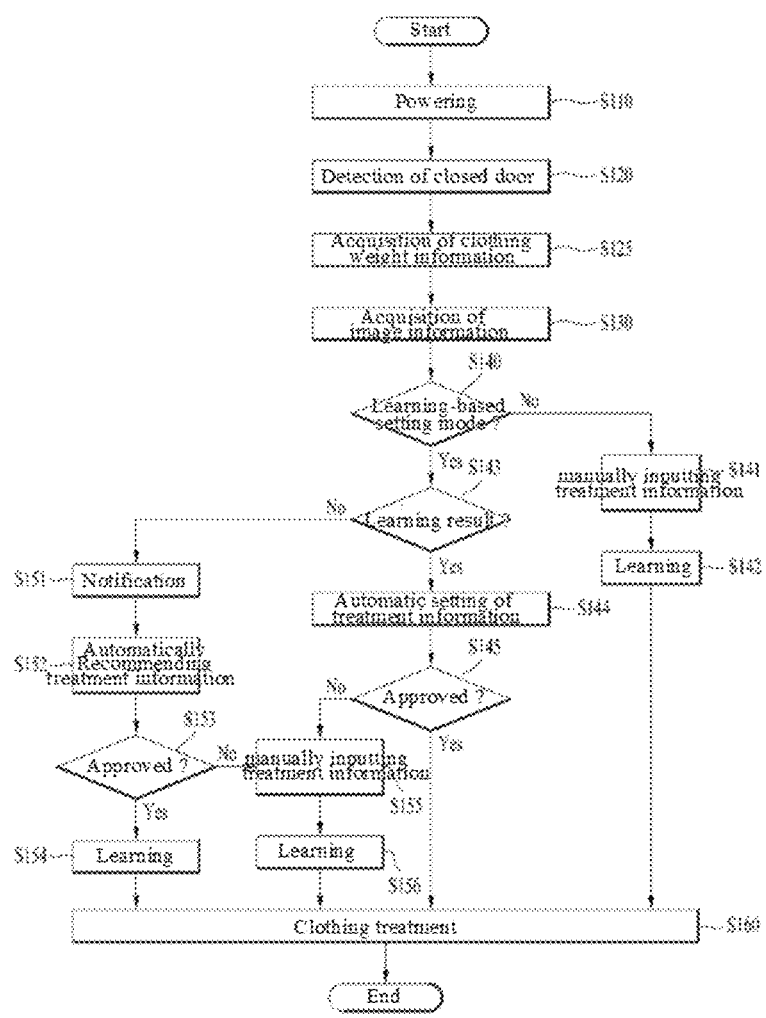
FIG. 9 is a flow chart showing a control method of a clothing managing apparatus according to another embodiment of the present disclosure.

FIG. 9 may be a modified control method of the method shown in FIG. 8.

When the user selects the learning-based setting mode, this may mean that the user does not input the clothing treatment information manually. That is, this may be an expression of the user intention not to select specific clothing treatment information including a plurality of clothing treatment courses or various combinations of clothing treatment information.

Therefore, in the present embodiment, unlike the control method shown in FIG. 6, when there is no learning result, a step S152 for automatically recommending clothing treatment information may be performed. This may be done in various ways, such as recommending clothing treatment information which is clothing treatment information matching with image information most similar to the current image information. In another example, the step S151 may be performed to notify the user of the recommendation or to inform that there is no learning result.

The user may approve or disapprove the recommended clothing treatment information. The approval and disapproval procedures or methods may be the same as described above.

When the user approves the recommended clothing treatment information, the learning be performed S154 and the clothing treatment S160 may be performed based on the approved clothing treatment information.

When the user does not approve the recommended clothing treatment information, the user may manually input new clothing treatment information S155 and then the learning S156 may be performed. Similarly, the clothing treatment S160 may be performed based on the clothing treatment information as manually input by the user.

Figure 10:
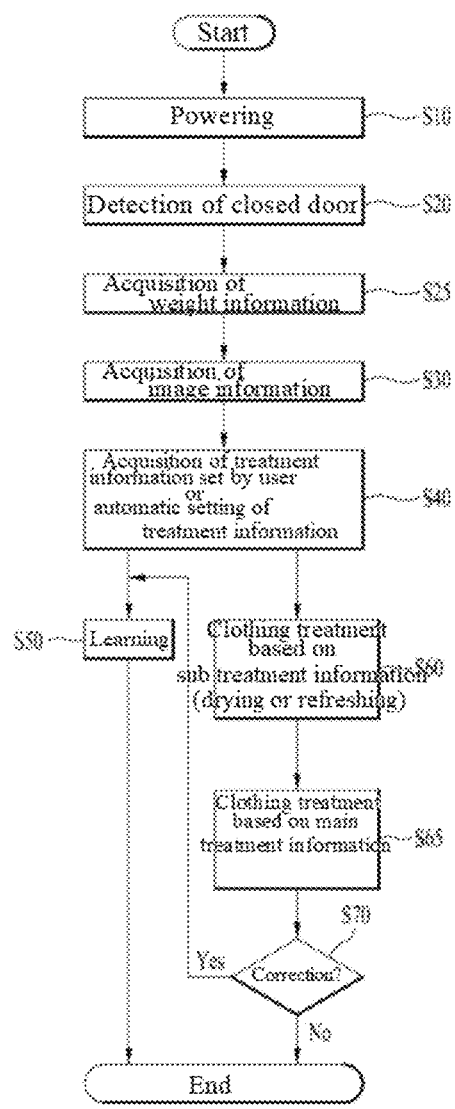
FIG. 10 is a flow chart showing a control method of a clothing managing apparatus according to another embodiment of the present disclosure.
Figure 11:
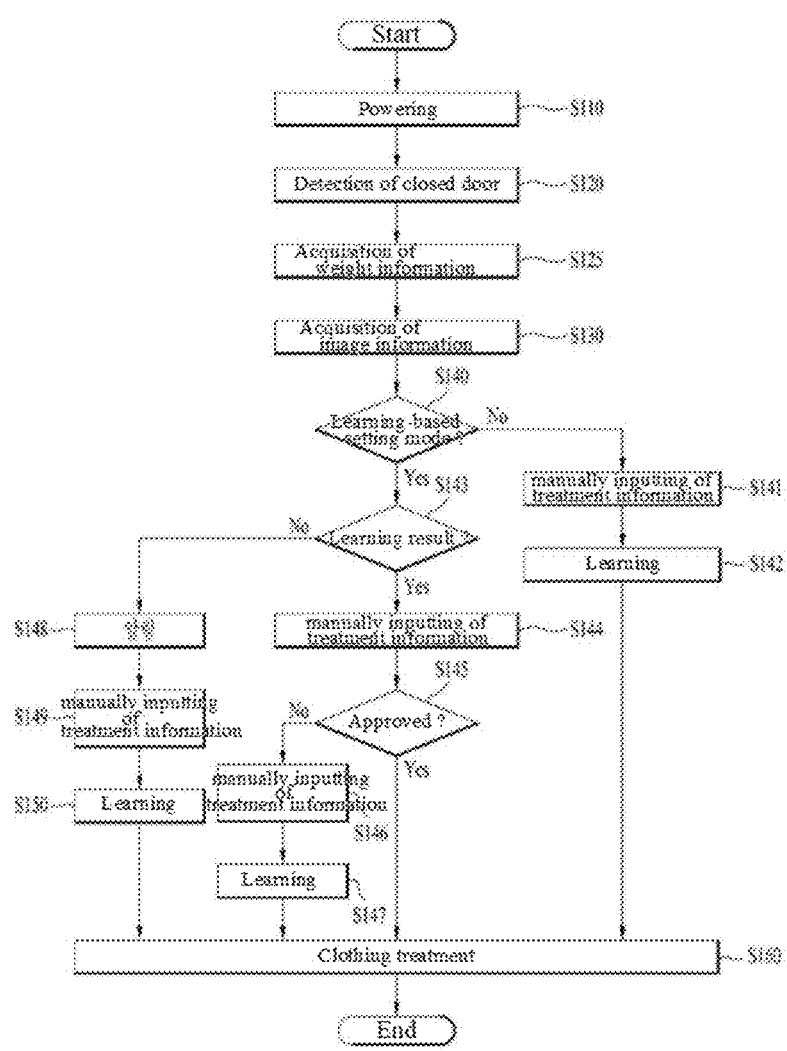
FIG. 11 is a flow chart showing a control method of a clothing managing apparatus according to another embodiment of the present disclosure.
Figure 12:
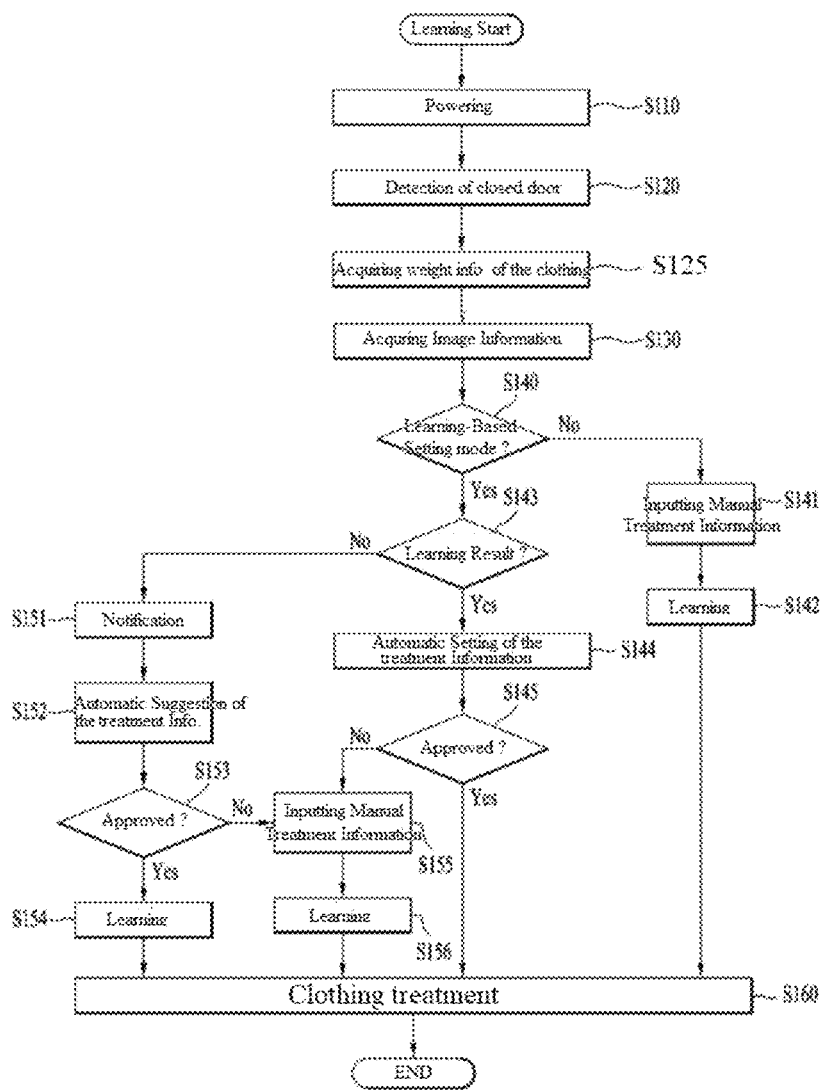
FIG. 12 is a flow chart showing a control method of a clothing managing apparatus according to another embodiment of the present disclosure.

In the above, the steps in which the fine dust sensing is performed and then the fine dust information is reflected is described in FIGS. 7 to 9. FIG. 10 to FIG. 12 may correspond to FIG. 7 to FIG. 9, respectively. In other words, FIG. 10 to FIG. 12 disclose embodiments in which the weight sensing of clothing is performed and then the weight information is used for treating clothing. Therefore, only objects to be sensed (that is, weight and dust) may be different, but remaining features may be the same therebetween. In other words, either the fine dust sensing or the weight information sensing may be performed, or both may be performed. The manner in which the sensing result is obtained and the learning is executed based on the sensing result may be the same between the embodiments in which the weight sensing is performed and then the weight information is reflected and the embodiments in which the fine dusts sensing is performed and then the fine dusts information is reflected.

Figure 13:
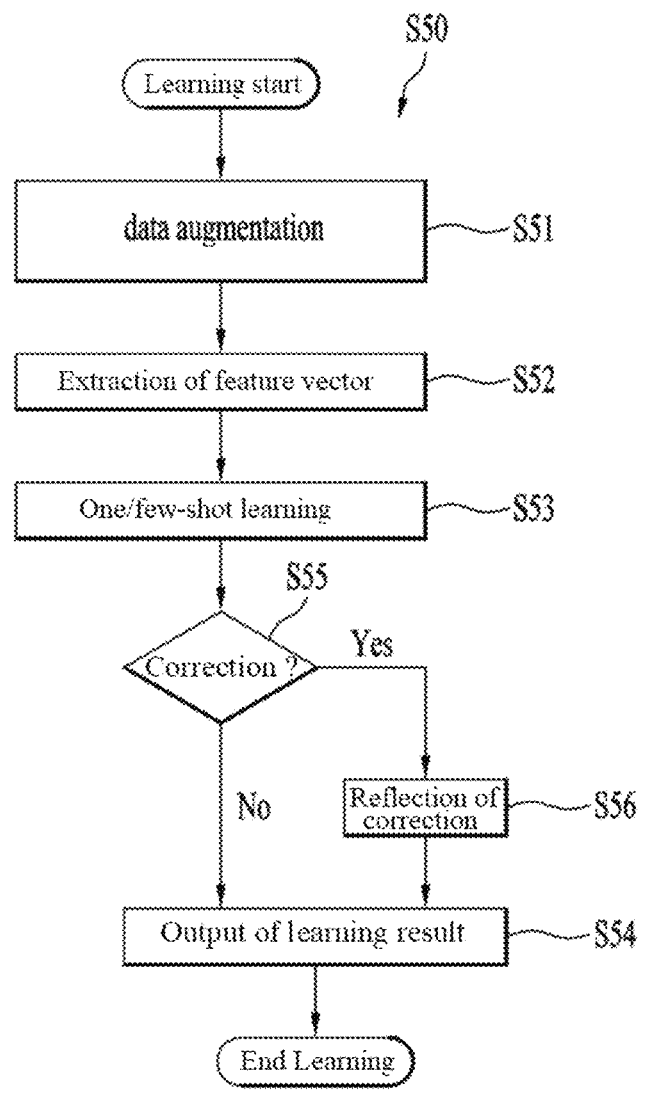
FIG. 13 is a flow chart showing a learning process shown in FIG. 7 to FIG. 12.

Hereinafter, with reference to FIG. 13, the learning that may be applied to one embodiment of the present invention is described in detail.

As described above, the learning in the present embodiments may mean a process of augmenting or increasing the number of matching combinations between previously acquired image information and acquired treatment information.

The following description may be used about performing the learning using image information.

Learning in this embodiment may be referred to as a process of performing learning by performing an image augmentation or data augmentation step S51 instead of the forced learning. Data augmentation may be performed by rotating, blurring, and brightening the acquired images. In addition, as described above, the data augmentation may refer to a process of securing images at various angles by rotating the clothing containing portion.

After augmenting the data, a feature vector may be extracted S52 using a CNN (Convolution Neural Network).

After the feature vector is extracted, one-shot/few-shot learning may be performed using a learning processor built in the clothing managing apparatus or a server S53. Then, the one-shot/few-shot learning results may be output S54. That is, the treatment information corresponding to the learning result is outputted and set. In another example, as described above, the output treatment information may not be used in a non-modified manner and may not be reflected but the learning result may be modified using the forced learning.

Standard deep learning systems require thousands or millions of examples to learn a concept, and cannot integrate new concepts easily. By contrast, humans have an incredible ability to do one-shot or few-shot learning. For instance, from just hearing a word used in a sentence, humans can infer a great deal about it, by leveraging what the syntax and semantics of the surrounding words tells us. Here, we draw inspiration from this to highlight a simple technique by which deep recurrent networks can similarly exploit their prior knowledge to learn a useful representation for a new image from little data.

In one example, in the present embodiment, a step S55 may be further performed between the learning execution S53 via one-shot/few-shot learning and the learning result outputting S5, thereby to determine whether correction of the treatment information is to be performed using various images acquired in the washing process as described above. When correction of the treatment information may be likely to be required as the clothing treatment is performed. The learning execution S53 and learning result outputting S54 may be performed during clothing treatment or before termination of clothing treatment. Thus, the step S55 for determining whether the correction is to be performed may be smoothly executed.

Upon determination that the correction is not required, the learned result may be output in a non-modified manner. Upon determination that the correction is required, the machine may output the learning result reflecting the correction information to the treatment information.

Figure 14:
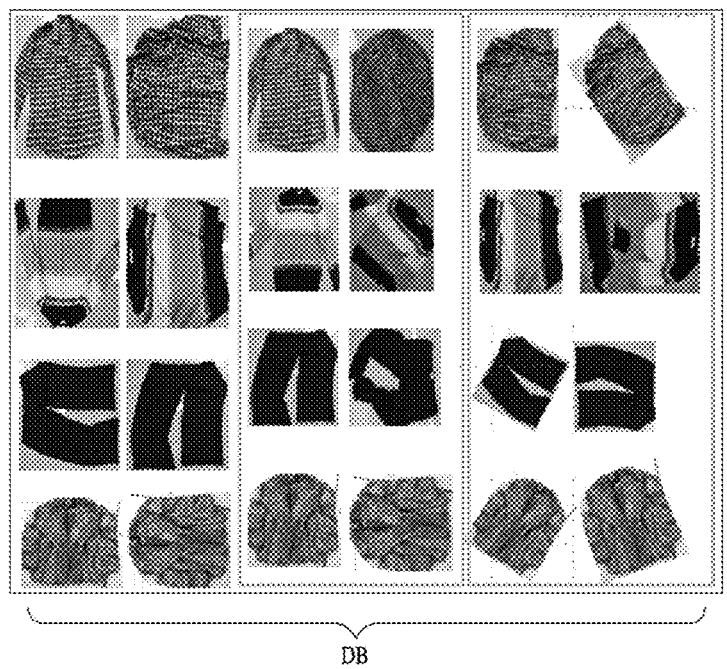
FIG. 14 shows one example of a database (DB) image.
Figure 15:
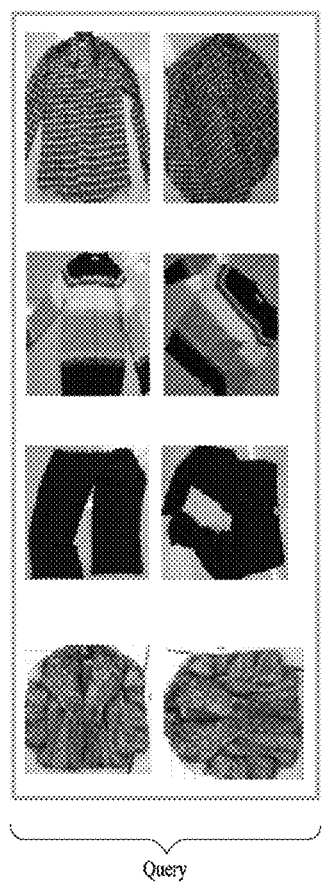
FIG. 15 shows one example of a query image.
Figure 16:
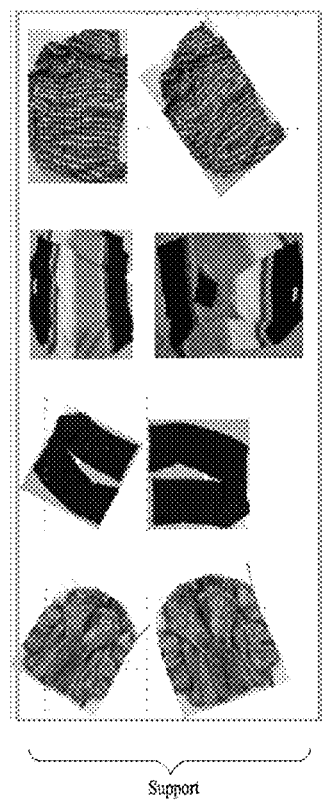
FIG. 16 shows one example of a support image.

Hereinafter, the learning process using the clothing image will be described in detail using FIGS. 14 to 17. FIG. 14 shows one example of images in a database DB. FIG. 15 shows a query image and FIG. 16 shows one example of a support image. Such images may be generated by an RGB sensor, an RGB camera, or a gray camera. In FIG. 14 to FIG. 16, a color image is converted into a black and white image for convenience. Each image is one example of shirts, knits, suit pants and fur clothing.

As shown, the query image and the support image may be images of the database.

A predetermined number of the query images and the support images are randomly classified in the database DB image including the previously acquired images and the currently acquired images.

The query image refers to an image for augmentation and classification. Therefore, the query image may be the currently acquired image or an image before the classification and classification. That is, since the query image is an image before learning, the query image may be an image having no corresponding output value. The support image may be a necessary part used for obtaining information for clustering between main feature domains obtained from the same encoder. Such a support image may be obtained by acquiring images at various angles while rotating/moving the clothing as described above.

Various classification schemes may be used to obtain feature information from the query image. In this embodiment, a CNN scheme may be used as one example of the augmentation scheme.

Figure 17:
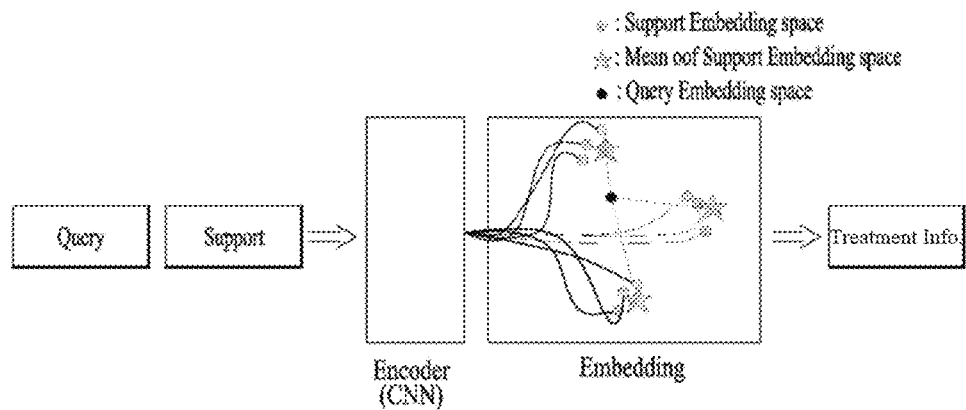
FIG. 17 shows a process to classify and learn the query image.

As shown in FIG. 17, a feature vector is generated using an encoder that performs an augmentation of the query image. This feature vector is transformed into an embedding space, that is, a distance domain. Thus, same features of the treatment information will be clustered such that spacing therebetween is smaller. Heterogeneous features thereof are separated from each other.

Then, an average of the feature vectors extracted from the support image acquired as described in the above embodiment is obtained. A distance between the average of the support feature vector and the query feature vector is transformed into a stochastic value according to a known formula. The known formula may be a known augmentation formula in one shot learning or few shot learning scheme.

Therefore, the query image may be augmented. In other words, the query image may match with the previously learned image. Thus, treatment information may be output.

Referring to FIG. 18, the fine dust removal logic will be described in detail.

FIG. 18 shows 4 fine dusts levels according to the amounts of fine dusts. A predetermined control logic may correspond to each level.

In this embodiment, steam may be supplied to effectively remove fine dusts from clothing. Further, in this embodiment, a vibrating removable hanger may be employed to effectively remove fine dusts from the clothing. Moisture from the steam generated from pure water surrounds fine dusts and then the moisture surrounding the dusts fall down. High-temperature steam has 1/1600 size of water particles, so that it penetrates deeper into the cloth, and then catches odor particles and further has the effect of killing germs in cloth.

Therefore, the steam is more excellent in fine dusts removal effect than supplying strong cold winds or hot winds to the clothing is. In another example, sterilization, odor removal and refreshing effects are even more outstanding when using the steam.

The higher the level of the fine dusts, the more the amount of steam and the longer steam is supplied. During steam supply, vibrating the removable hanger may cause the fine dusts to drop from the clothing. Therefore, it is preferable that the vibration frequency increases as the fine dust level becomes higher.

The default steam time duration as shown may be a time set by default in the fine dust removal logic. Thus, the final steam time duration may be proportional to the fine dust factor. The fine dust factor may be estimated by the fine dust amount and the voltage value as the output of the fine dust sensor. The fine dust amount in a second column in FIG. 13 may mean the fine dust amount that are visible to the user arithmetically. The fine dust factor in a third column may be a factor used to determine a steam time duration.

The fine dust factor may be a value 1 to 2. When there is a large amount of fine dust, as described above, the fine dust sensor may output a low voltage. Therefore, the fine dust factor may be estimated in inverse proportion to the output voltage value. The voltage value Y may be a voltage ratio. The voltage ratio may be a ratio of a maximum output voltage to an output voltage of the fine dust sensor. The maximum output value may be preset. Therefore, the steam time duration may be prevented from being excessively increased. The fine dust factor for estimating the final steam time duration may vary from one fine dust level to another. The fine dust factor is 1 for the level 1, is 1.2 for the level 2, is 1.4 for the level 3 and is 1.7 for the level 4 in one example.

The calculation formula or the calculation scheme of the final steam time duration may be set differently between the levels. However, as the amount of fine dusts increases, the final steam time duration should increase proportionally or stepwise. Likewise, the amount of steam or vibration frequency should be increased proportionally or step by step.

The fine dust treatment logic may be preset and embedded in the clothing managing apparatus. In another example, the fine dusts treatment logic may be updated via the server. For this purpose, the clothing managing apparatus transmits the fine dust related information to the server.

Figure 19:
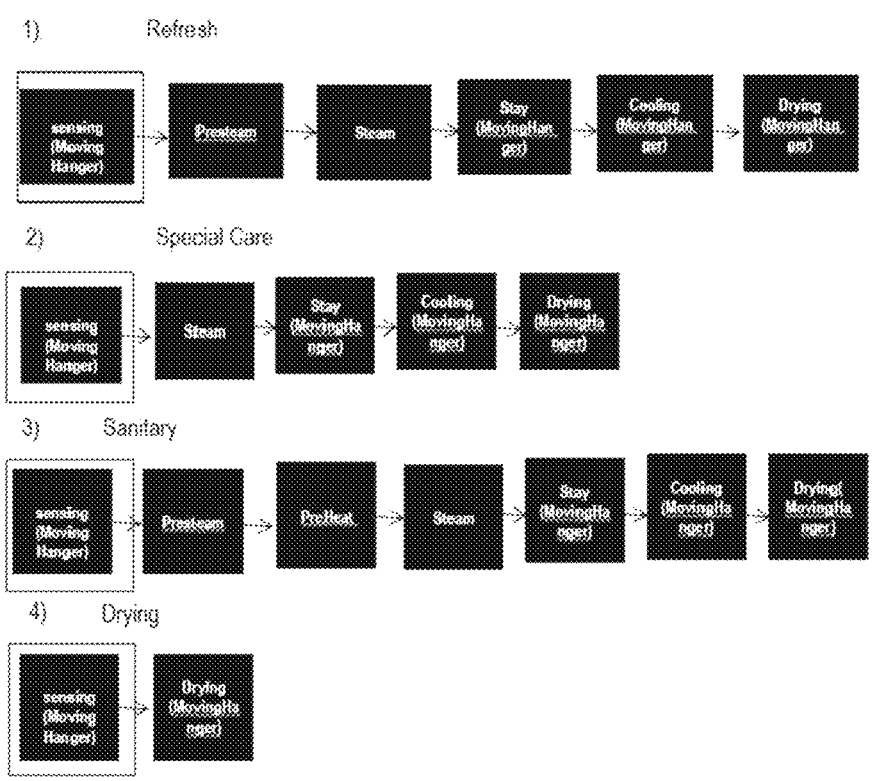
FIG. 19 shows a detailed process of main treatment information (course information) that may be applied to one embodiment of the present disclosure.

FIG. 19 shows a fine dust information reflection process in the styling course, the special care course, the sterilization course, and the drying course as one example of the main treatment information.

When the styling course is set by user selection or via learning, the fine dusts control logic may be applied automatically. That is, a fine dust process for removing fine duct from the clothing may be added to a basic styling course (pre-steam to drying).

In this course, the removable hanger may vibrate and the sensor may sense the fine dust amount. The sensed fine dust information may be reflected to change the control factors in subsequent processes. For example, the steam time duration, the amount of steam and the removable hanger vibration frequency may change.

The pre-steam step may be referred to as a step of changing the interior of the clothing containing portion to a high-temperature and high-humidity environment in order to enhance the steam effect in the main steam step. The pre-steam step may be performed in a course to treat general clothing or clothing requiring sterilization.

In the sterilization or sanitary course, sterilization is performed at high temperature. Therefore, a preheating step for supplying hot air may be performed between the pre-steam step and the main steam step.

After supplying the steam, the removable hanger is vibrated to increase the steam penetration effect and to drop fine dusts from the clothing. Then, a cold air supply step and a drying step may be performed. In the drying step, hot air having a temperature slightly higher than room temperature may be supplied. Therefore, after termination of the drying step, the user may feel warm of the clothing when the clothing is withdrawn out of the cabinet. In the drying step, the clothing may get warm using a warm air having a temperature that is higher than the body temperature and lower than 40 degrees Celsius.

In one example, a drying course is configured to dry wet clothes. In this case, the drying step may be performed after the fine dust process is first performed. However, when vibrating the clothes that should be otherwise subjected to the drying, it may be difficult to separate the fine dusts from the clothes. Therefore, in this case, the drying may be performed first and then the fine dusts process may be performed. After the fine dust process has been performed, the fine dusts removal logic may be applied to perform fine dust removal when necessary. Then, after the drying step has been performed, the process may be terminated.

Thus, according to the present embodiment, the clothing treatment may be performed to be optimized for the fine dust removal using the fine dust sensor even when there is no specific intervention of the user. Further, the user may intuitively recognize the effect of fine dust reduction using the user interface.

In one example, when reflecting the weight information, the processes shown in FIG. 19 may be modified.

In one example, when clothing is determined to be wet using the weight information, the drying cycle may be performed before each course of interest is performed. Then, each course of interest may be performed according to the process shown in FIG. 19.

Figures 20, 21:
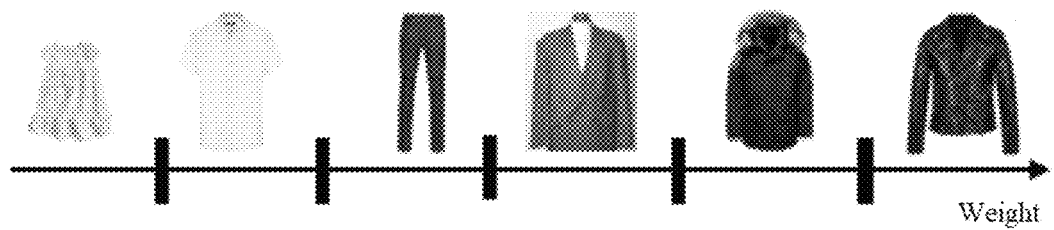
FIG. 20 shows one example of fine dust-related information sent to a server from a clothing managing apparatus according to one embodiment of the present disclosure.
FIG. 21 shows classification criteria of a type of clothing depending on a weight of the clothing.

FIG. 20 shows one example of fine dust-related information being passed from the clothing managing apparatus to the server. In each step of the fine dusts control process, the clothing treatment information may be transmitted from the clothing managing apparatus to the server in the form of a time table.

Sensing value of fine dusts over time during the clothing treatment (that is, sensing values before and after the clothing treatment), steam time duration, amount of steam and the removable hanger vibration frequency may be delivered to the server. After the steam process has been terminated, fine dusts may be detected again. Thus, the red-detection result may indicate whether the fine dusts have been completely removed or very effectively removed. After the steam process termination, fine dust may be present inside the clothing containing portion. In other words, even when the fine dust are separated from the clothing, the fine dust may remain inside the clothing containing portion. Afterwards, air circulation and filtering may be used to effectively remove fine dusts inside the clothing containing portion.

In one example, the server analyzes the information to determine whether fine dusts have been removed effectively. Based on a result of analysis, the server may develop a stronger fine dust control logic which may be provided to the clothing managing apparatus.

Further, the clothing managing apparatus itself may analyze the information. In one example, the apparatus may learn and reflect the results of performing the fine dust removal logic on specific clothing. This is because the apparatus may identify the specific clothing using image information.

When the fine dust control logic corresponding to the level 2 is applied to specific clothing, the fine dust removal effect may be insufficient. Thus, thereafter, despite the same fine dust amount, the fine dusts control logic corresponding to the level 3 is applied to specific clothing. The user may be informed of the learning process or learning result. In repose, the user may approve or disapprove the learning process or learning result.

FIG. 21 shows a weight range for each type of clothing. That is, it may be known that an average weight range may vary depending on the type of clothing. In one example, a weight may increase in the order of baby clothes, dress shirts, blue pants, formal tops, padding and leather jumpers. The processor may roughly classify the types of clothing based on the weight range. The processor may classify clothing types more precisely by mapping image information and weight information with each other.

In one example, a recommended course for specific image information may be learned by the processor. In this connection, since the weight information is mapped with the image information, clothing information may be recognized. In other words, specific image information corresponds to specific clothing and correspondingly a specific course is learned.

This information may be sent to the server. In another example, the performance data and the performance result data of the clothing treatment using the learned course may be transmitted to the server. The server may analyze the data to determine if the clothing treatment has been performed effectively.

Therefore, the present system including the sever and the apparatus may use big data to update the current logic to a more effective clothing treatment logic which will be provided to the present clothing managing apparatus. The present system may provide a more accurate recommendation course. The present system may provide a fine dust removal logic that may be more effective for fine dust removal.

The clothing managing apparatus may be provided that evolves or becomes smarter via learning of the initially set control logic by the apparatus or via update of the initially set control logic by the server.

According to the embodiment described above, even when there is no specific action of the user, the clothing managing apparatus can automatically dry the clothing and perform the course of interest. In addition, even when there is no specific action of the user, the fine dusts may be removed optimally by the present apparatus such that the use convenience can be greatly improved. Further, the present apparatus may evolve via learning and the user may be aware of this evolving. This may improve the satisfaction level of use. In particular, the treatment information may be set automatically so that the user may have less trouble of inputting the treatment information. Thus, the clothing managing apparatus which is very convenient to use may be provided.

The illustrations of the presented embodiments are provided so that a person of ordinary skill in the art of the present disclosure may use or implement the present disclosure. Various modifications to these embodiments will be readily apparent to those skilled in the art of the present disclosure. The general principles defined herein may be applied to other embodiments without departing from the scope of the present invention. Thus, the present disclosure is not to be construed as limited to the embodiments set forth herein but rather to be accorded the widest scope consistent with the principles and novel features set forth herein.

What is claimed is:

1. A clothing treatment apparatus comprising:
   a cabinet;
   a clothing portion that is disposed in the cabinet and that is configured to receive clothing in a hanging manner;
   a door that is provided on the cabinet and that is configured to open and close the clothing portion;
   a camera that is disposed on the cabinet or the door and that is configured to generate image information of the clothing hung in the clothing portion;
   a user interface that is disposed on the door and that is configured to receive, from a user, treatment information for the clothing; and
   a processor configured to:
      obtain a learning result from a learning operation using image information previously acquired by the camera and treatment information previously acquired through the user interface,
      perform augmentation and classification of image information currently acquired by the camera with respect to the learning result to match the currently acquired image information to the previously acquired image information,
      based on the augmentation and classification, generate and set current treatment information for the clothing hung in the clothing portion, and
      control the clothing treatment apparatus to treat the clothing hung in the clothing portion based on the set current treatment information,
      wherein the learning operation comprises determining presence or absence of a learning result corresponding to the currently acquired image information, and
      wherein the processor is configured to, based on a determination that a corresponding learning result is absent, initiate a forced learning operation to generate matched treatment information previously approved by the user with the currently acquired image information.

2. The clothing treatment apparatus of claim 1, wherein the user interface comprises at least one of a speaker configured to output voice, a microphone configured to receive voice, a display, or a button or touch panel configured to receive pressurization or physical contact from the user.

3. The clothing treatment apparatus of claim 1, further comprising a door sensor configured to detect a state of the door, wherein the camera is configured to generate the image information based on power being applied to the clothing treatment apparatus and a closed state of the door being detected by the door sensor.

4. The clothing treatment apparatus of claim 1, wherein the image information is an input parameter for the learning operation, and the treatment information is an output parameter from the learning operation.

5. The clothing treatment apparatus of claim 1, wherein the learning operation is performed by a learning processor included in the clothing treatment apparatus or a learning processor in a server communicating with the clothing treatment apparatus.

6. The clothing treatment apparatus of claim 1, wherein the processor is configured to, based on a determination that a corresponding learning result is present, generate and set treatment information corresponding to the learning result.

7. The clothing treatment apparatus of claim 6, wherein the processor is configured to, after setting the treatment information, request approval or disapproval of the set treatment information by the user through the user interface.

8. The clothing treatment apparatus of claim 7, wherein the processor is configured to, based on the user disapproving the set treatment information, initiate a forced learning operation to generate matched treatment information approved by the user with the currently acquired image information.

9. The clothing treatment apparatus of claim 1, wherein the learning operation is configured to increase a number of combinations of a plurality of images distinguished from each other and treatment information corresponding to the plurality of images, respectively.

10. The clothing treatment apparatus of claim 1, wherein the user interface comprises a start input interface configured to allow the user to approve the set treatment information and then start the clothing treatment based on the set treatment information.

11. The clothing treatment apparatus of claim 1, wherein the treatment information comprises a plurality of courses corresponding to treatment courses performed by the clothing treatment apparatus.

12. The clothing treatment apparatus of claim 11, wherein the plurality of courses comprise a plurality of primary courses, wherein a plurality of auxiliary courses are provided for each primary course information.

13. The clothing treatment apparatus of claim 11, wherein the plurality of courses comprises a plurality of learning-based courses in which the current treatment information is automatically set based on a result of the learning operation,
wherein one of the plurality of courses is only manually selected by the user.

14. The clothing treatment apparatus of claim 11, wherein the user interface comprises a course selection interface configured to allow the user to select one of the plurality of courses,
wherein one of the plurality of courses comprises a learning-based course in which the current treatment information is automatically set based on a result of the learning operation.

15. The clothing treatment apparatus of claim 14, wherein the processor is configured to, based on the learning-based course being selected using the course selection interface in a most recent previous course, select the current learning-based course by default.

16. The clothing treatment apparatus of claim 13, wherein the processor is configured to, based on selection of a setting course other than the learning-based course among the plurality of courses, perform learning by using the currently acquired image information for the selected setting course.

17. The clothing treatment apparatus of claim 11, wherein the processor is configured to, based on a learning result corresponding to at least one course among the plurality of courses, automatically set the current treatment information.

18. The clothing treatment apparatus of claim 11, wherein the processor is configured to, based on a learning result corresponding to each of the plurality of courses, automatically set the current treatment information.

* * * * *